(12) United States Patent
Santini

(10) Patent No.: US 6,172,848 B1
(45) Date of Patent: Jan. 9, 2001

(54) WRITE HEAD WITH SELF ALIGNED PEDESTAL SHAPED POLE TIPS THAT ARE SEPARATED BY A ZERO THROAT HEIGHT DEFINING LAYER

(75) Inventor: Hugo Alberto Emilio Santini, San Jose, CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/058,518

(22) Filed: Apr. 10, 1998

(51) Int. Cl.$^7$ ................................................. G11B 5/147
(52) U.S. Cl. ......................... 360/126; 360/122; 360/113
(58) Field of Search ............................ 360/113, 119–121, 360/125, 126

(56) References Cited

U.S. PATENT DOCUMENTS

| | | | |
|---|---|---|---|
| 5,068,959 | 12/1991 | Sidman | 29/603 |
| 5,111,352 | 5/1992 | Das et al. | 360/113 |
| 5,141,623 | 8/1992 | Cohen et al. | 205/122 |
| 5,142,768 | 9/1992 | Aboaf et al. | 29/603 |
| 5,168,409 | 12/1992 | Koyama et al. | 360/113 |
| 5,240,740 | 8/1993 | Frey et al. | 427/130 |
| 5,363,265 | 11/1994 | Hsie et al. | 360/113 |
| 5,438,747 | 8/1995 | Krounbi et al. | 29/603 |
| 5,452,164 | 9/1995 | Cole et al. | 360/113 |
| 5,555,147 | 9/1996 | Maruyama | 360/113 |
| 5,559,653 | 9/1996 | Shouji et al. | 360/126 |
| 5,600,519 | 2/1997 | Heim et al. | 360/126 |
| 5,621,596 | 4/1997 | Santini | 360/126 |
| 5,640,753 | 6/1997 | Schultz et al. | 29/603 |
| 5,649,351 | * 7/1997 | Cole et al. | 29/603.14 |
| 5,652,687 | * 7/1997 | Chen et al. | 360/126 |
| 5,719,730 | * 2/1998 | Chang et al. | 360/113 |
| 5,726,841 | * 3/1998 | Tong et al. | 360/122 |
| 5,793,578 | * 8/1998 | Heim et al. | 360/126 |
| 5,802,700 | * 9/1998 | Chen et al. | 29/603.14 |
| 5,805,391 | * 9/1998 | Chang et al. | 360/113 |

FOREIGN PATENT DOCUMENTS

| | | | |
|---|---|---|---|
| 58-100212 | 12/1981 | (JP) | 360/119 |
| 58-111116 | 7/1983 | (JP) | 29/603 |
| 58-128017 | 7/1983 | (JP) | 360/119 |
| 6-111245 | 4/1994 | (JP) | 360/120 |

\* cited by examiner

Primary Examiner—William J. Klimowicz
(74) Attorney, Agent, or Firm—Gary Cary Ware & Freidenrich LLP; Ervin F. Johnston

(57) ABSTRACT

A merged magnetic head has a top first pole tip layer and a bottom second pole tip layer which are located entirely between an air bearing surface and a coil layer. A write gap layer separates the pole tip layers from one another at the ABS. A zero throat height (ZTH) defining layer is located adjacent the top gap layer between the pole tip layers and is recessed from the ABS so as to further separate the pole tip layers from one another at a location recessed from the ABS so as to define the zero throat height of the write head where the first and second pole pieces first commence to separate from one another after the ABS. A method of construction, which may be substantially a dry process or substantially a wet process, employs ion milling to form the shapes of the pole tip layers while protecting a bottom first pole piece layer from thinning except for notching of the bottom first pole piece layer adjacent side walls of the top first pole tip layer, the protection being provided by the ZTH defining layer in field regions of the head.

25 Claims, 32 Drawing Sheets

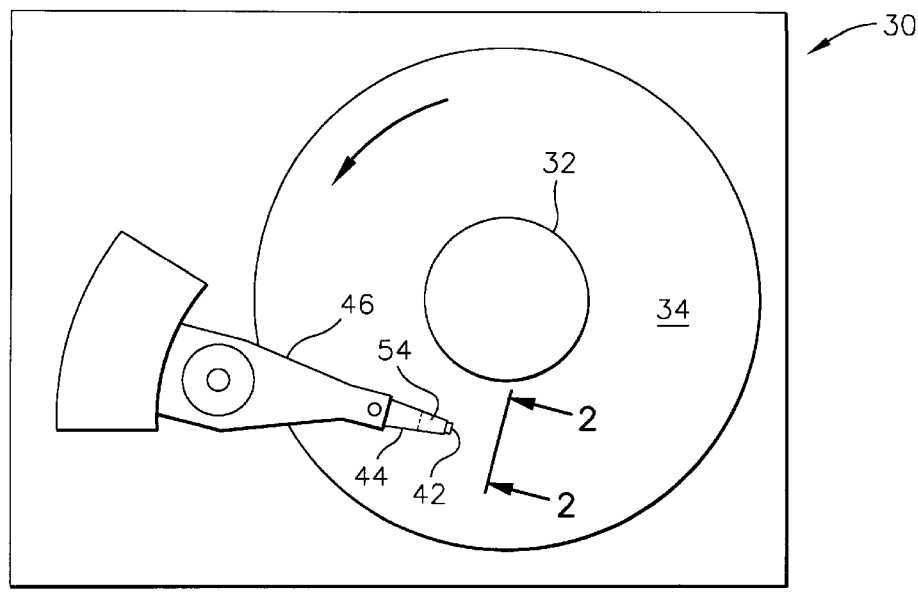
FIG. 1
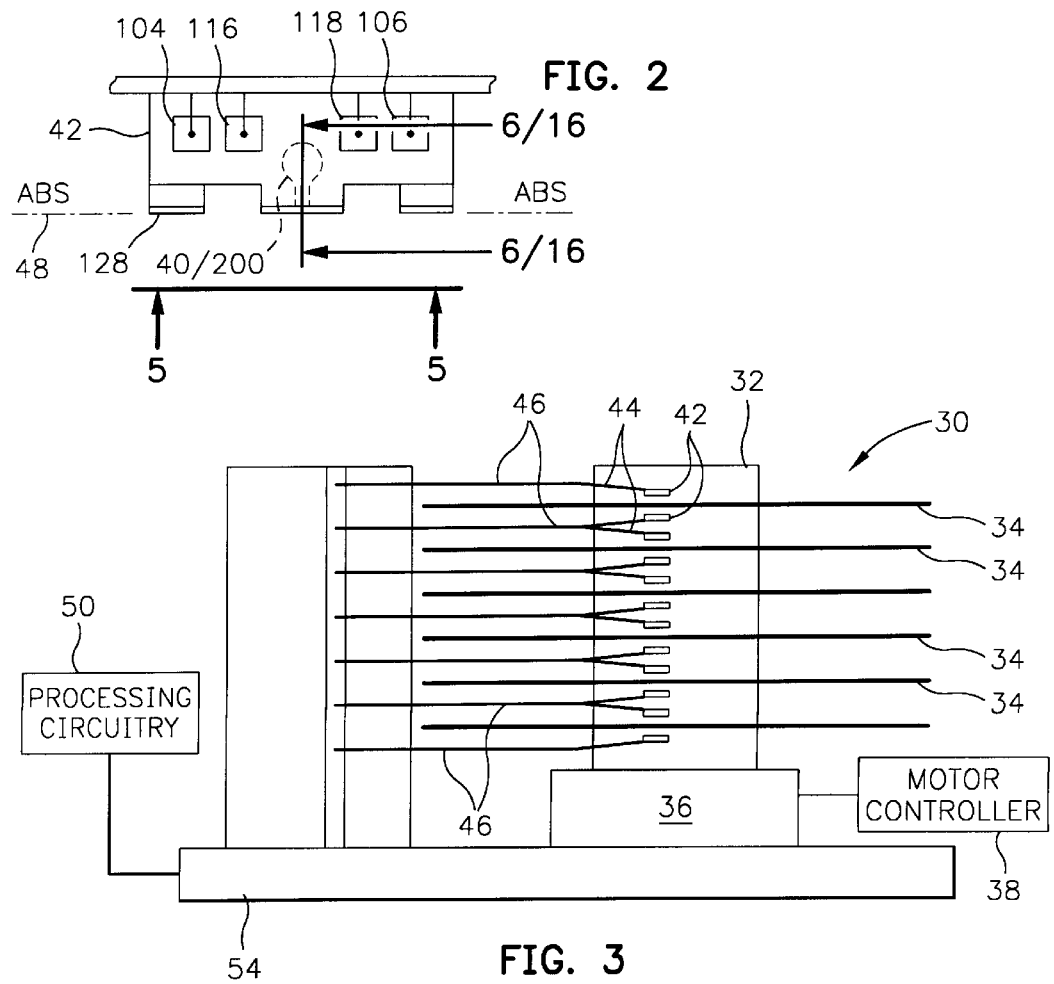
FIG. 2
FIG. 3

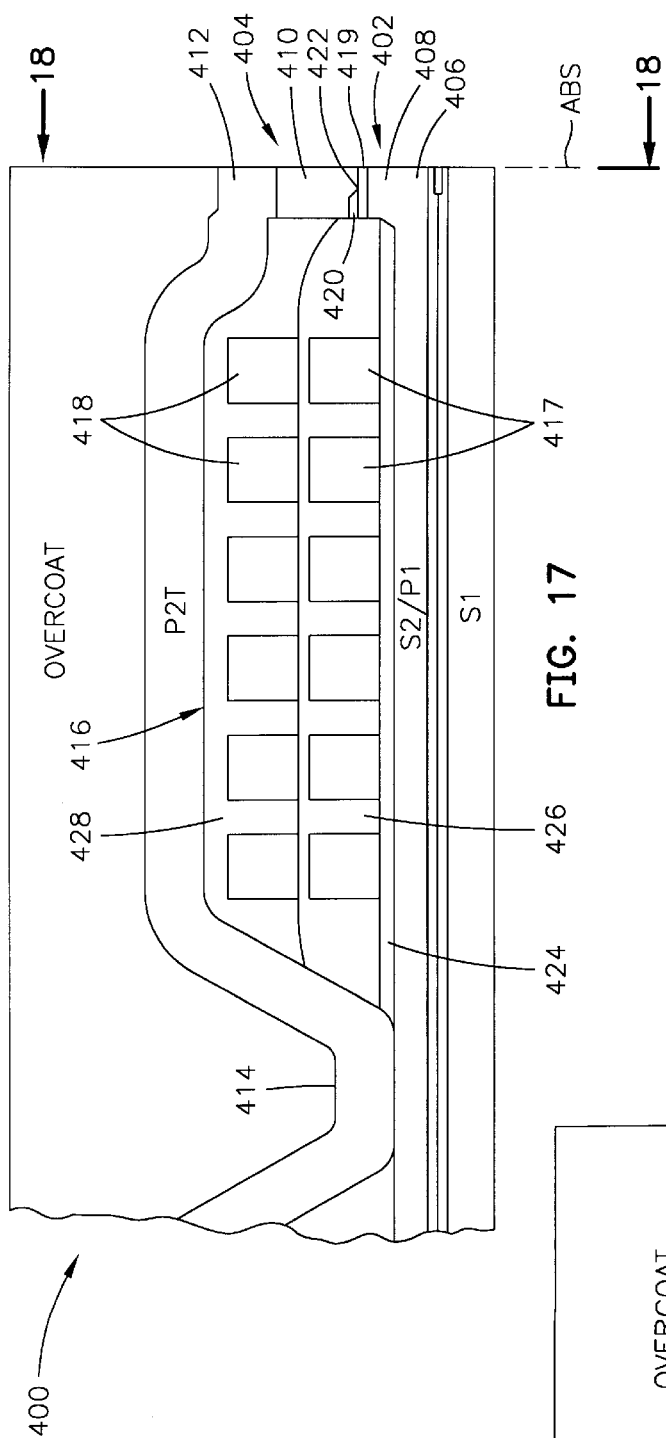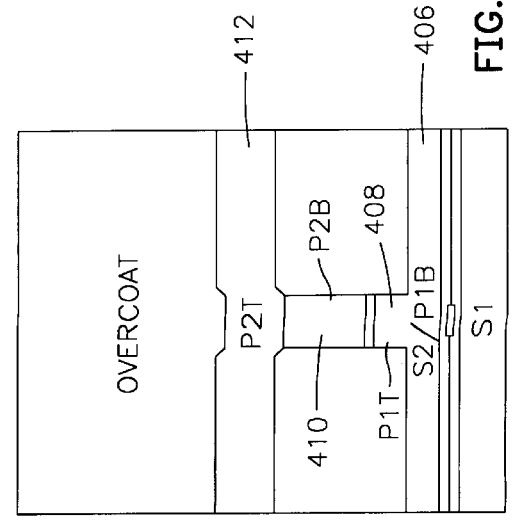

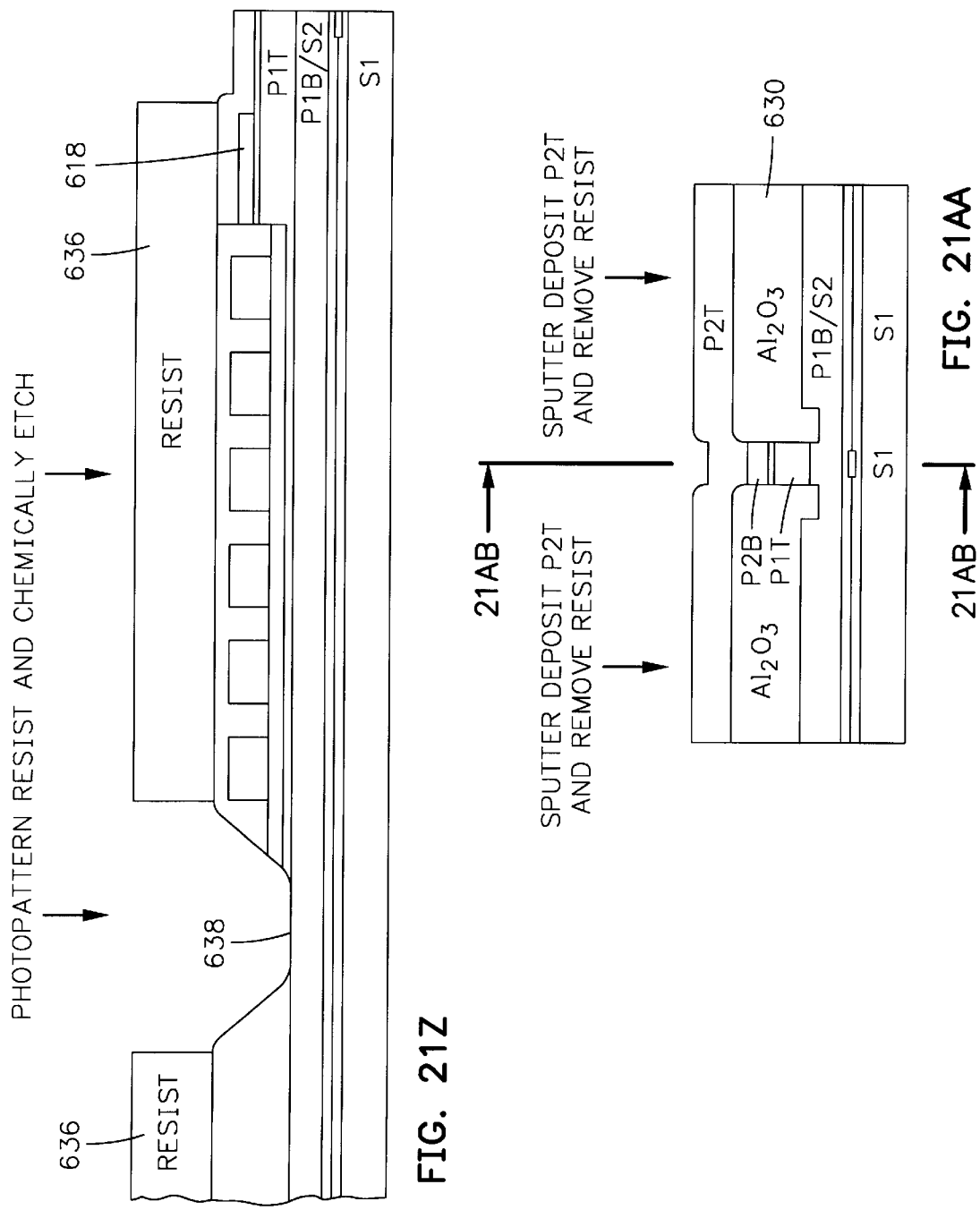

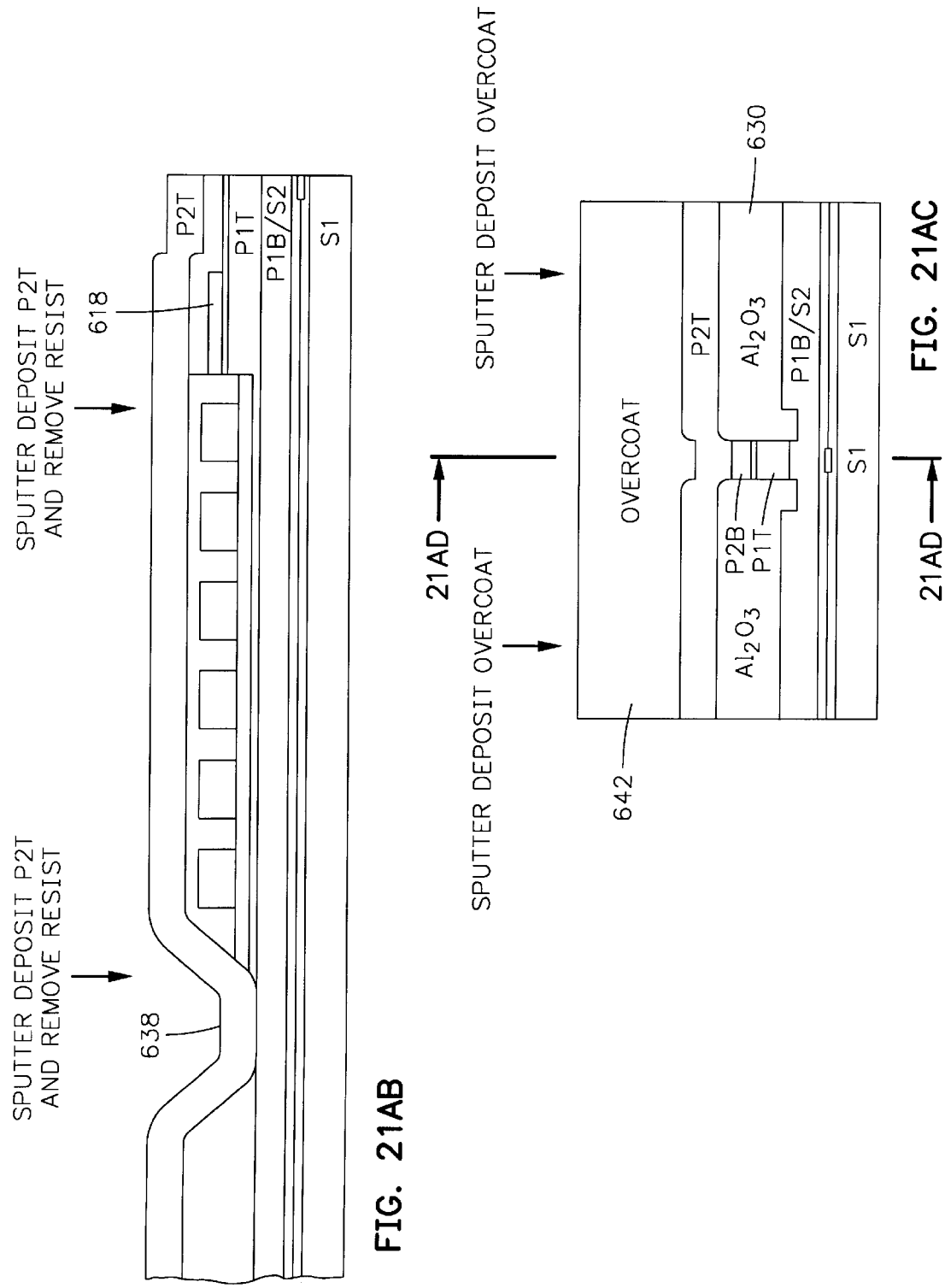

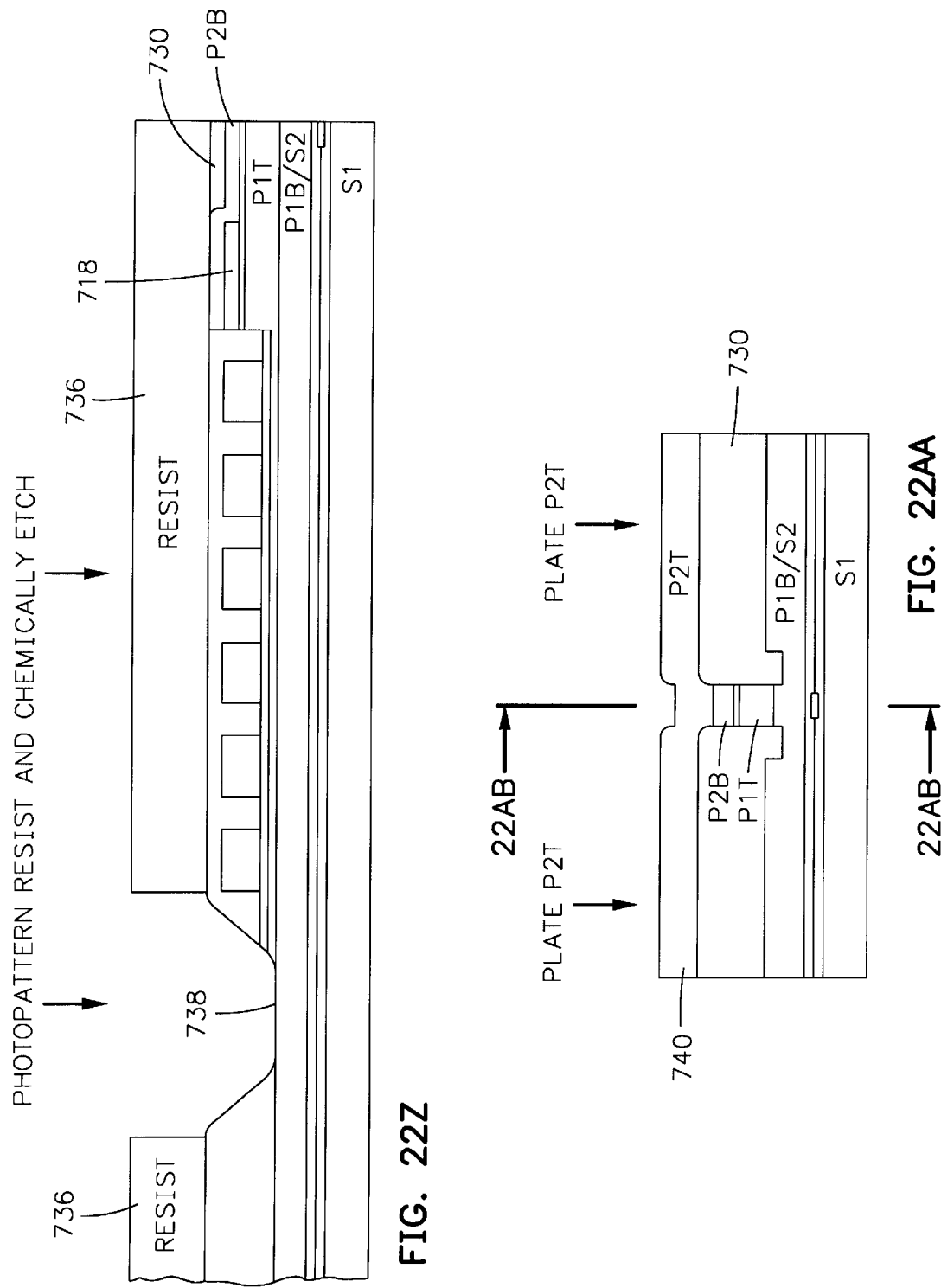

WRITE HEAD WITH SELF ALIGNED PEDESTAL SHAPED POLE TIPS THAT ARE SEPARATED BY A ZERO THROAT HEIGHT DEFINING LAYER

BACKGROUND OF THE INVENTION

1. Field of the Invention

The present invention relates to a write head with self aligned pedestal shaped pole tips that are separated by a zero throat height (ZTH) defining layer and more particularly to a write head with a top first pole tip and a bottom second pole tip separated by a gap layer at an air bearing surface (ABS) and further separated by a ZTH defining layer at a location recessed from the ABS wherein the top first pole tip and the bottom second pole tip are located entirely between the ABS and a coil layer.

2. Description of the Related Art

An inductive write head includes a coil layer embedded in first, second and third insulation layers (insulation stack), the insulation stack being located between first and second pole piece layers. A gap is formed between the first and second pole piece layers by a gap layer at an air bearing surface (ABS) of the write head. The pole piece layers are connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk or longitudinal tracks on a moving magnetic tape.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium. Since magnetic flux decays as it travels down the length of the narrow second pole tip, shortening the second pole tip will increase the flux reaching the recording media. Therefore, performance can be optimized by aggressively placing the flare point close to the ABS.

Another parameter important in the design of a write head is the location of the zero throat height (ZTH). The zero throat height is the location where the first and second pole pieces first separate from one another after the ABS. ZTH separation is imposed by an insulation layer, typically the first insulation layer in the insulation stack. Flux leakage between the first and second pole pieces is minimized by locating the ZTH as close as possible to the ABS.

Unfortunately, the aforementioned design parameters require a tradeoff in the fabrication of the second pole tip. The second pole tip should be well-defined in order to produce well-defined written tracks on the rotating disk. Poor definition of the second pole tip may result in overwriting of adjacent tracks. A well-defined second pole tip should have parallel planar side walls which are perpendicular to the ABS. This definition is difficult to achieve because the second pole tip is typically formed along with the yoke after the formation of the first insulation layer, the coil layer and the second and third insulation layers. Each insulation layer includes a hard-baked photoresist having a sloping front surface.

After construction, the first, second and third insulation layers present front sloping surfaces which face the ABS. The ZTH defining layer rises from a plane normal to the ABS at an angle (apex angle) to the plane. After hard baking of the insulation layers and deposition of a metallic seed-layer the sloping surfaces of the insulation layers exhibit a high optical reflectivity. When the second pole tip and yoke are constructed, a thick layer of photoresist is spun on top of the insulation layers and photo patterned to shape the second pole tip, using the conventional photo-lithography technique. In the photo-lithography step, ultraviolet light is directed vertically through slits in an opaque mask, exposing areas of the photoresist which are to be removed by a subsequent development step. One of the areas to be removed is the area where the second pole piece (pole tip and yoke) is to be formed by plating. Unfortunately, when ultraviolet light strikes the sloping surfaces of the insulation layers in a flaring region of the second pole piece, the ultraviolet light is reflected forward, toward the ABS, into photoresist areas at the sides of the second pole tip region. After development, the side walls of the photoresist extend outwardly from the intended ultraviolet pattern, causing the pole tip plated therein to be poorly formed. This is called "reflective notching". As stated hereinabove this causes overwriting of adjacent tracks on a rotating disk. It should be evident that, if the flare point is recessed far enough into the head, the effect of reflective notching would be reduced or eliminated since it would occur behind the sloping surfaces. However, this solution produces a long second pole tip which quickly reduces the amount of flux reaching the recording medium.

The high profile of the insulation stack causes another problem after the photoresist is spun on a wafer. When the photoresist is spun on a wafer it is substantially planarized across the wafer. The thickness of the resist in the second pole tip region is higher than other regions of the head since the second pole tip is substantially lower on the wafer than the yoke portion of the second pole piece. During the light exposure step the light progressively scatters in the deep photoresist like light in a body of water causing poor resolution during the light exposure step.

A scheme for minimizing the reflective notching and poor resolution problems is to construct the second pole piece with bottom and top second pole tips. The bottom second pole tip is constructed before the insulation layers to eliminate the reflective notching problem. After forming the first pole piece layer and the write gap layer, a photoresist layer is spun on the partially completed head. Ultraviolet light from the photo-patterning step is not reflected forward since the photoresist layer does not cover an insulation stack. Further, the photoresist is significantly thinner in the pole tip region so that significantly less light scattering takes place. After plating the bottom second pole tip the photoresist layer is removed and the first insulation layer, the coil layer and the second and third insulation layers are formed. The top second pole tip is then stitched (connected) to the bottom second pole tip and extends from the ABS to the back gap. Since the bottom second pole tip is well-formed, well-formed notches can be made in the first pole piece, as discussed hereinafter. However, with this head, the ZTH is dependent upon the location of the recessed end of the bottom second pole tip. Since the bottom second pole tip has to be long enough to provide a sufficient stitching area, this length may result in undesirable flux leakage between the first and second pole pieces.

Once the bottom second pole tip is formed, it is desirable to notch the first pole tip of the first pole piece opposite the first and second corners at the base of the bottom second pole tip so that flux transfer between the pole tips does not stray beyond the track width defined by the bottom second pole tip. Notching provides the first pole piece with a track width that substantially matches the track width of the bottom second pole tip. A prior art process for notching the first pole piece entails ion beam milling the gap layer and the first pole piece, employing the bottom second pole tip as a mask. The gap layer is typically alumina and the first and second pole pieces and pole tips are typically Permalloy (NiFe). The alumina mills more slowly than the Permalloy; thus the top of the bottom second pole tip and a top surface of the first pole piece are milled more quickly than the gap layer. Further, during ion milling, there is much redeposition (redep) of alumina on surfaces of the workpiece. In order to minimize redep, the milling ion beam is typically directed at an angle to a normal through the layers, which performs milling and cleanup simultaneously. The gap layer in the field remote from the first and second corners of the bottom second pole tip is the first to be milled because of a shadowing effect at the first and second corners caused by the bottom second pole tip when the ion beam is angled. In this case, the ion stream will overmill the first pole piece before the gap layer is removed adjacent the first and second corners of the bottom second pole tip in the region where the notching is to take place. After the gap layer is removed above the sites where the notching is to take place, ion milling continues in order to notch the first pole piece. Overmilling of the first pole piece continues to take place in the field beyond the notches, thereby forming surfaces of the first pole piece that slope downwardly from the notches. As is known, such overmilling of the first pole piece can expose leads to the MR sensor, thereby rendering the head inoperative.

Even if overmilling of the first pole piece can be controlled, there is potentially a more troublesome problem, namely overmilling the top of the bottom second pole tip when the unwanted portions of the gap layer are milled and notches are formed. In order to compensate for this overmilling, the aspect ratio (ratio of thickness of photoresist to track width of the bottom second pole tip) is increased so that a top portion of the top of the bottom second pole tip can be sacrificed during the milling steps. When the aspect ratio is increased, definition of the bottom second pole tip is degraded because of the thickness of the photoresist, discussed hereinabove, resulting in track overwriting.

SUMMARY OF THE INVENTION

The present invention overcomes the aforementioned reflective notching problem by providing a write head with a stitched second pole piece wherein a bottom second pole tip of the second pole piece is formed by a unique method of making before constructing an insulation stack. The stitched second pole piece is not dependent upon a recessed wall of the bottom second pole tip defining the ZTH nor is the first pole piece overmilled in a field during the construction of the bottom second pole tip.

The present write head has first and second pole pieces wherein the first pole piece has a top first pole tip layer on a bottom first pole piece layer and the second 20 pole piece has a top second pole piece layer on a bottom second pole tip layer. The pole tip layers are highly defined and may have a submicron track width. The pole piece layers are wider than the pole tip layers. With all these layers, including a gap layer extending to the ABS, an ABS view of the head would have an "I" shape with a top portion of the vertical portion of the "I" comprising the top first pole tip layer and a bottom portion of the vertical portion of the "I" comprising the bottom second pole tip layer with the pole tip layers separated by the gap layer. The bottom and top portions of the "I" comprise the bottom first pole piece layer and the top second pole piece layer respectively. The top first pole tip layer and the bottom second pole tip layer are located entirely between the ABS and a coil layer and are pedestal shaped with front and back walls and first and second side walls self aligned with respect to one another by the method of construction.

The bottom first pole tip layer and the top second pole tip layer are separated by the write gap layer as stated hereinabove. The pole tip layers are further separated by a ZTH defining layer at a location recessed from the ABS below or above the write gap layer. During construction of the write head, the ZTH defining layer is also located in a field beyond the pole tip layers so as to prevent the aforementioned problem of overmilling the bottom first pole piece layer. The write head can be the write head portion of a merged magnetic head or the write head portion of a side by side read and write head.

The method of construction includes forming a bottom first pole piece layer in a pole tip site and in the field, forming a top first pole tip layer on the bottom first pole piece layer in the pole tip site and in the field, forming a write gap layer on the top first pole tip layer in the pole tip site and in the field, forming the zero throat height (ZTH) defining layer on the write gap layer in the field and in a back portion of the pole tip site so as to leave a front portion of the write gap layer adjacent the ABS exposed and with the ZTH defining insulation having a front wall recessed from the ABS that is located adjacent a zero throat height (ZTH) site of the magnetic head, forming a bottom second pole tip layer on the ZTH defining layer and on the exposed portion of the write gap layer, forming a mask on the bottom second pole tip layer in the pole tip site for defining a top first pole tip layer and a bottom second pole tip layer that are located in the pole site at said ZTH site and extend forward and rearward toward the ABS and the back gap from the ZTH site, ion milling the layers until the bottom second pole tip layer, the ZTH defining layer, the write gap layer and the top first pole tip layer are milled except under the mask, removing the mask leaving the top first pole tip layer on the bottom first pole piece layer, a gap layer on the top first pole tip layer that is adjacent the ABS, the ZTH defining layer on the gap layer with an edge recessed from the ABS that defines the ZTH and the bottom second pole tip layer on the ZTH defining layer and the write gap layer, forming a top second pole piece layer on the bottom second pole tip layer and connecting the top second pole piece layer to the bottom first pole piece layer at the back gap. By this method the ZTH of the head can be very accurately formed and protected from process variations. If desired, the order of formation of the write gap layer and the ZTH defining layer may be reversed.

An object of the present invention is to provide a write head that has a very accurate ZTH, highly defined pole tips which may have a submicron track width and a bottom first pole piece layer that has a uniform thickness in field regions.

Another object is to provide a write head wherein the ZTH is defined between pedestal type pole tips layers that are separated by a gap layer at an ABS.

A further object is to provide a stitched second pole piece wherein the ZTH is not dependent upon the location of a back wall of a bottom second pole tip layer.

Still another object is to provide a write head with self aligned pole tip layers and a notched bottom first pole piece layer that are formed by ion milling without thinning the bottom first pole piece layer in field regions beyond the notching.

Still a further object is to obtain the aforementioned objects as well as providing a merged magnetic head wherein a top second pole piece layer is substantially planar except at a back gap.

Still another object is to provide a method of making a write head wherein reflective notching is obviated, a ZTH is accurately formed and not altered by process variations, a bottom first pole piece layer is notched without thinning the bottom first pole piece layer in a field beyond the notching and pole tip layers are self aligned.

Other objects and advantages of the invention will be more greatly appreciated upon reading the following description taken together with the accompanying drawings.

BRIEF DESCRIPTION OF THE DRAWINGS

FIG. 1 is a planar view of an exemplary magnetic disk drive;

FIG. 2 is an end view of a slider with a magnetic head of the disk drive as seen in plane 2—2;

FIG. 3 is an elevation view of the magnetic disk drive wherein multiple disks and magnetic heads are employed;

FIG. 17 is a longitudinal cross-sectional view of another embodiment of the present invention;

FIG. 18 is a view taken along plane 18—18 of FIG. 17;

FIG. 21AA is the same as FIG. 21X except a top second pole piece layer has been sputter deposited;

FIG. 21AB is a view taken along plane 21AB—21AB of FIG. 21AA;

FIG. 21AC is the same as FIG. 21AA except an overcoat layer has been sputter deposited;

FIG. 21AD is a view taken along plane 21AD—21AD of FIG. 21AC;

FIG. 22AA is the same as FIG. 22X except a top second pole piece layer has been frame plated;

FIG. 22AB is a view taken along plane 22AB—22AB of FIG. 22AA;

FIG. 22AC is the same as FIG. 22AA except an overcoat layer has been sputter deposited;

FIG. 22AD is a view taken along plane 22AD—22AD of FIG. 22AC;

DESCRIPTION OF THE PREFERRED EMBODIMENTS

Magnetic Disk Drive

Figure 4:
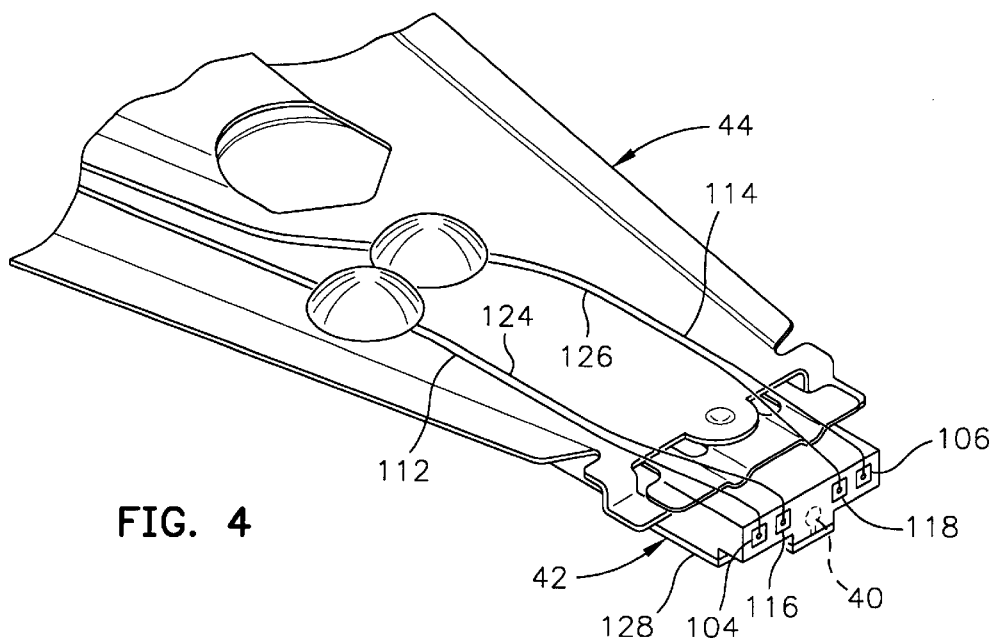
FIG. 4 is an isometric illustration of an exemplary suspension system for supporting the slider and magnetic head.

Referring now to the drawings wherein like reference numerals designate like or similar parts throughout the several views there is illustrated in FIGS. 1–3 a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to the suspension 44. The components described hereinabove may be mounted on a frame 54, as shown in FIG. 3.

Figure 5:
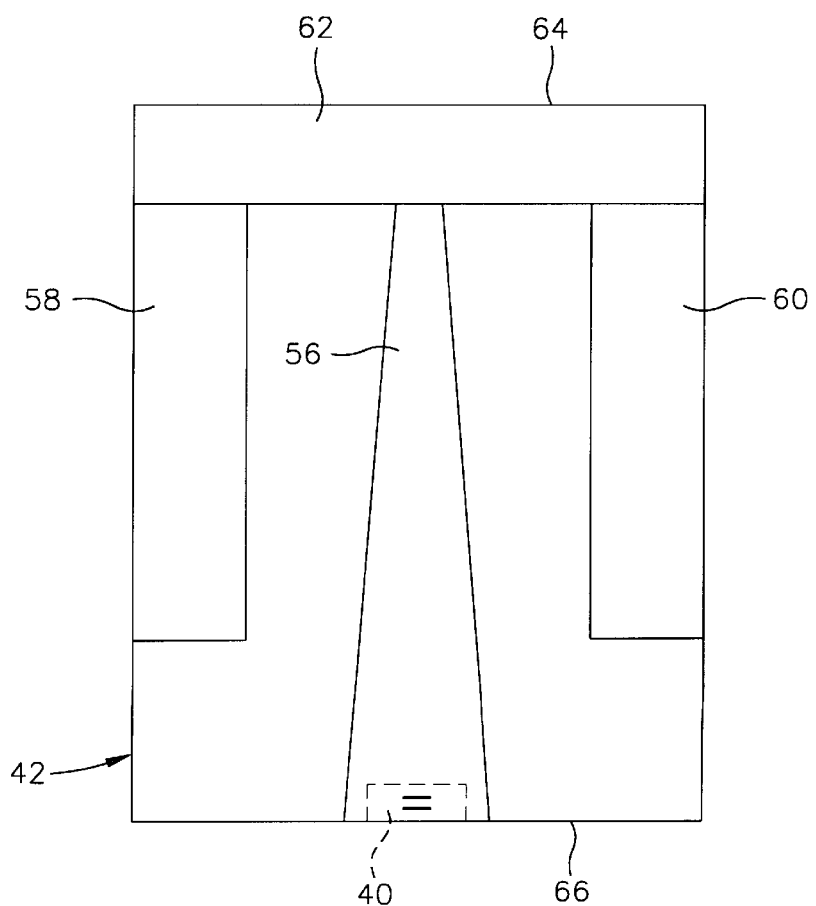
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Prior Art Merged MR Head

Figure 6:
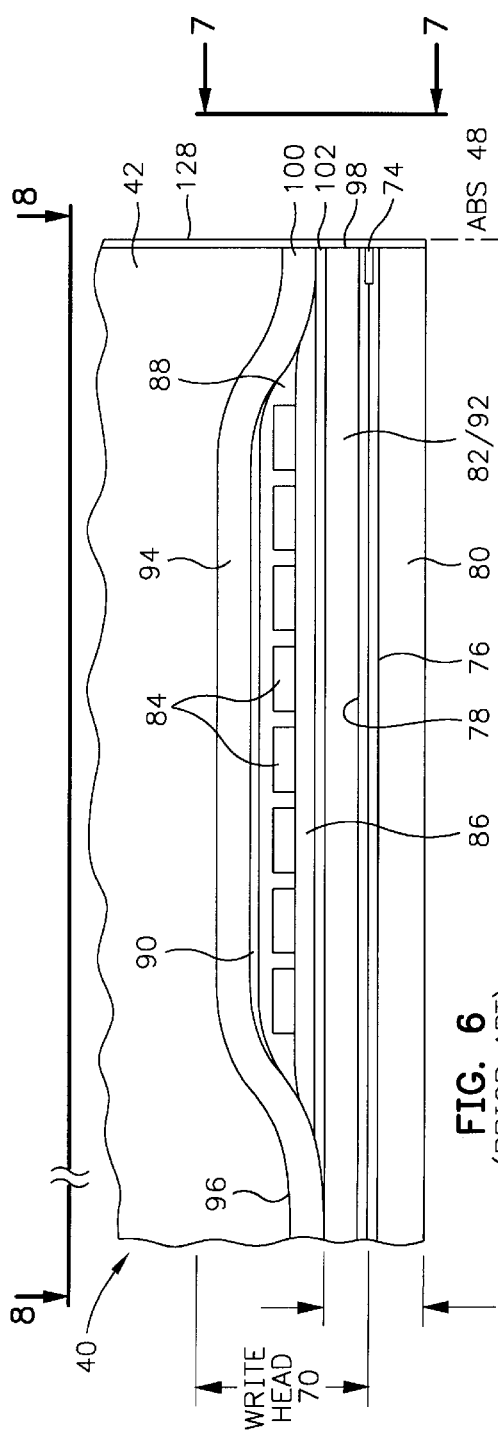
FIG. 6 is a partial view of the slider and a prior art magnetic head as seen in plane 6—6 of FIG. 2.
Figure 7:
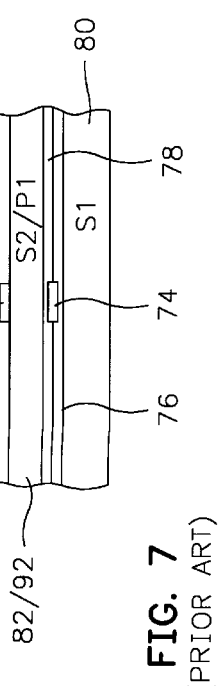
FIG. 7 is a partial ABS view of the slider taken along plane 7—7 of FIG. 6 to show the read and write elements of the prior art magnetic head.

FIG. 6 is a side cross-sectional elevation view of the merged MR head 40 which has a prior art write head portion 70 and a read head portion 72, the read head portion employing an MR sensor 74. FIG. 7 is an ABS view of FIG. 6. The sensor 74 is located between first and second gap layers 76 and 78 and the gap layers are located between first and second shield layers 80 and 82. In response to external magnetic fields, the resistance of the sensor 74 changes. A sense current $I_S$ conducted through the sensor causes these resistance changes to be manifested as potential changes. These potential changes are then processed as readback signals by the processing circuitry 50 shown in FIG. 3.

Figure 8:
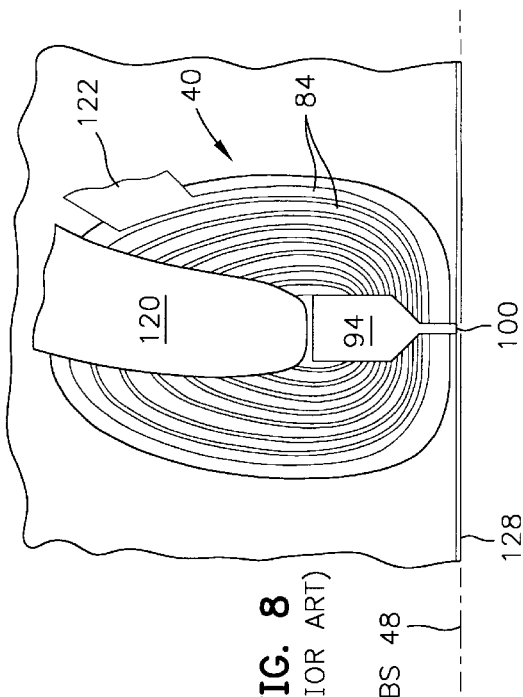
FIG. 8 is a view taken along plane 8—8 of FIG. 6 with all material above the second pole piece removed.

The prior art write head portion of the merged MR head includes a coil layer 84 located between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are located between first and second pole piece layers 92 and 94. The first and second pole piece layers 92 and 94 are magnetically coupled at a back gap 96 and have first and second pole tips 98 and 100 which are separated by a write gap layer 102 at the ABS. As shown in FIGS. 2 and 4, first and second solder connections 104 and 106 connect leads from the sensor 74 to leads 112 and 114 on the suspension 44 and third and fourth solder connections 116 and 118 connect leads 120 and 122 from the coil 84 (see FIG. 8) to leads 124 and 126 on the suspension. A wear layer 128 may be employed for protecting the sensitive elements of the magnetic head, as shown in FIGS. 2, 4, 6 and 7. It should be noted that the merged MR head 50 employs a single layer 82/92 to serve a double function as a second shield layer for the read head and as a first pole piece for the write head. A piggyback MR head employs two separate layers for these functions.

Figure 9:
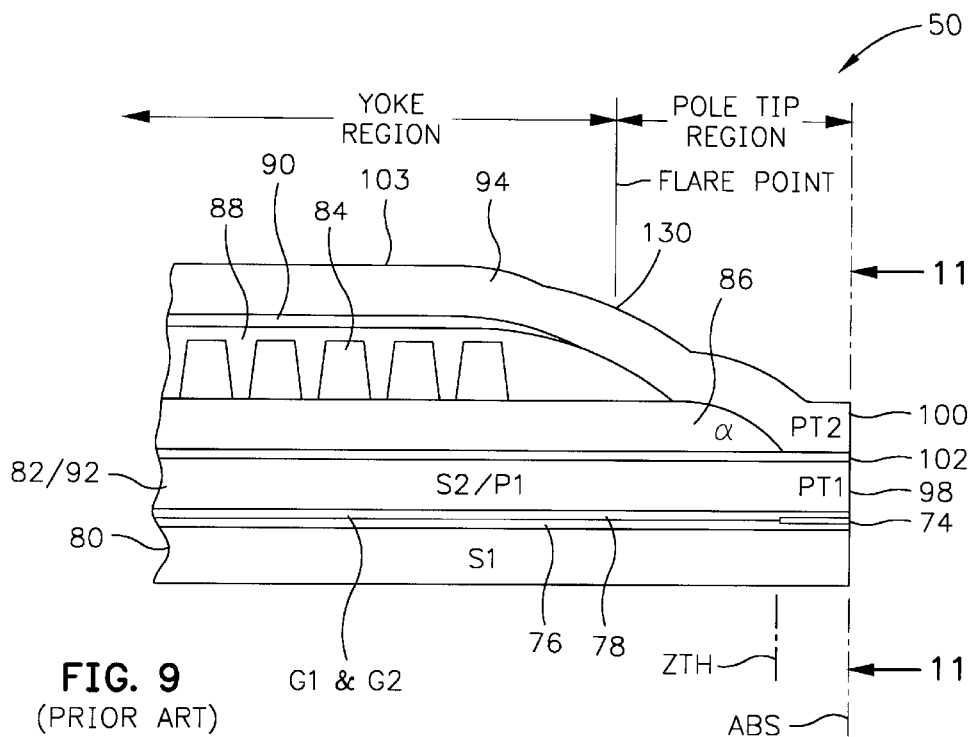
FIG. 9 is an enlarged front portion of the prior art magnetic head of FIG. 6 to show various details thereof.
Figure 12:
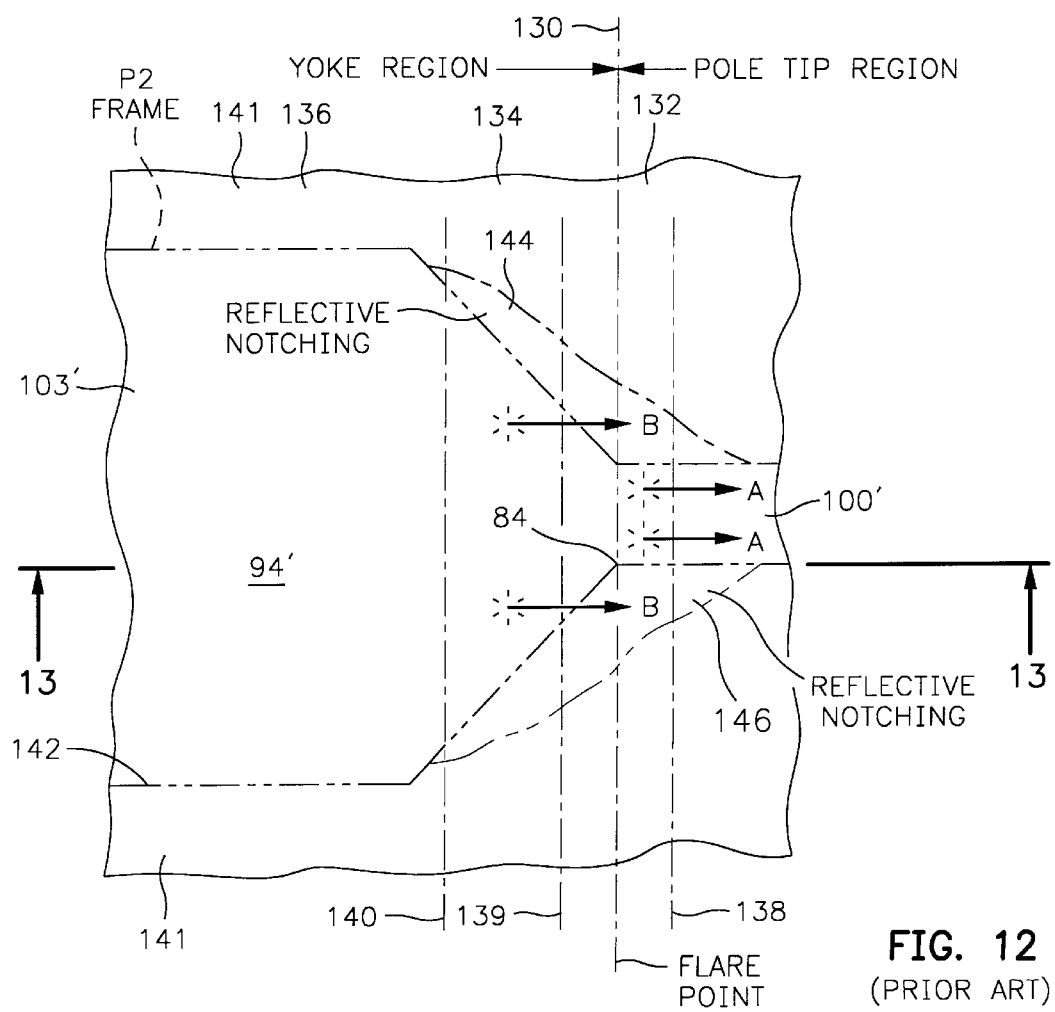
FIG. 12 is a view taken along plane 12—12 of FIG. 10.

As shown in FIG. 9, the second pole piece layer 94 has a pole tip region and a yoke region, the merging of these components being defined by a flare point 130 which is the location where the second pole piece layer 74 begins to widen as it recesses in the head. The second pole tip region extends from the ABS to the flare point 130, and the yoke region extends from the flare point 130 to the back gap 96 (see FIG. 6). In FIG. 12 are shown the pole tip region, the yoke region and the flare point 130 as defined by a photoresist mask (P2 frame).

Figure 13:
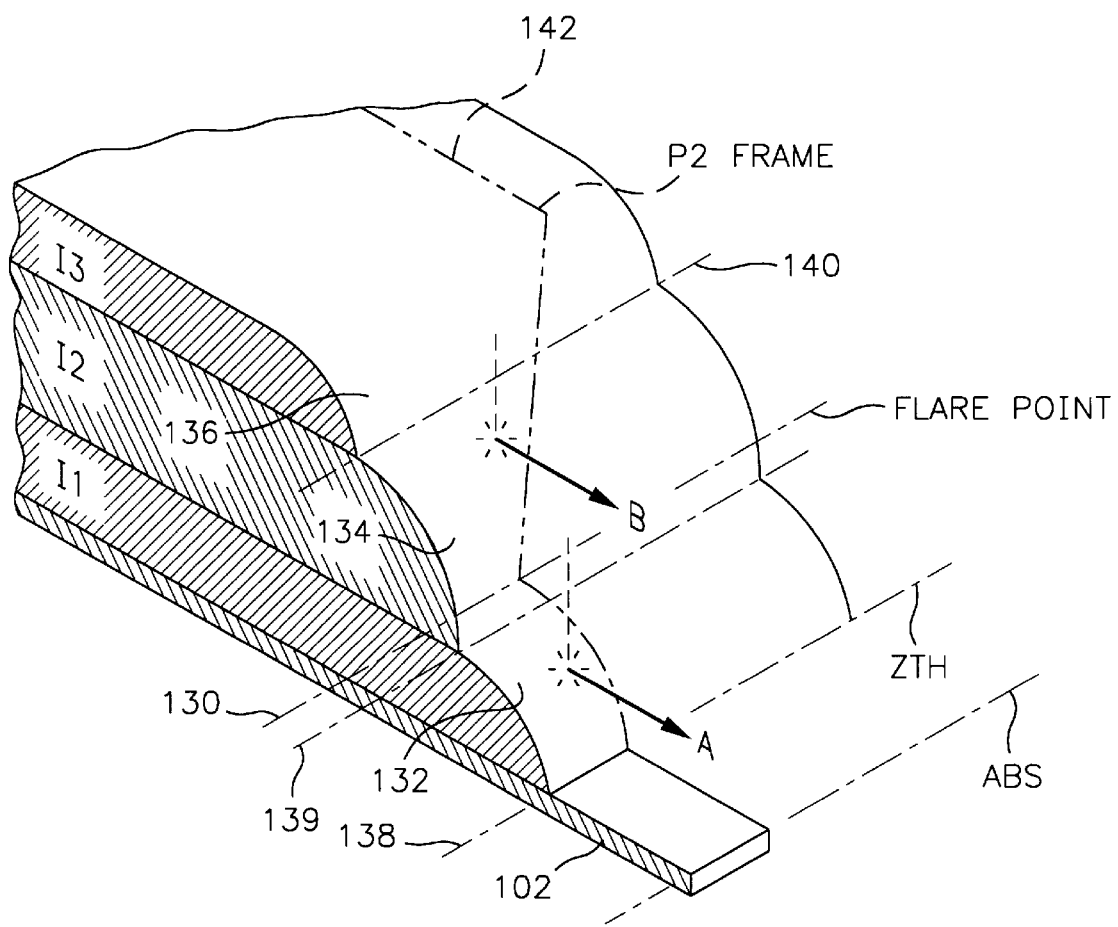
FIG. 13 is an isometric illustration of FIG. 10 without the P2 photoresist.

The location of the flare point 130, shown in FIGS. 9, 12 and 13, is an important design parameter of the write head. The further the flare point is recessed into the head, the longer the pole tip 100, which increases magnetic inductance and the likelihood that the pole tip 100 will saturate in response to flux from the coil layer 84. In the past it has been difficult to locate the flare point closer to the ABS than 10 $\mu$m because of a fabrication problem in making the second pole tip.

Another important design parameter in making the write head is the location of a zero throat height (ZTH), which is where the first and second pole piece layers 92 and 94 first separate from one another behind the ABS. It is important to locate the ZTH as close as possible to the ABS (typically within about 1 $\mu$m) in order to reduce flux loss between the pole pieces before the fields reach the gap layer 102 at the ABS. In the prior art, locating the ZTH close to the ABS contributed to the aforementioned problem of fabricating a well-defined second pole tip 100.

Figure 10:
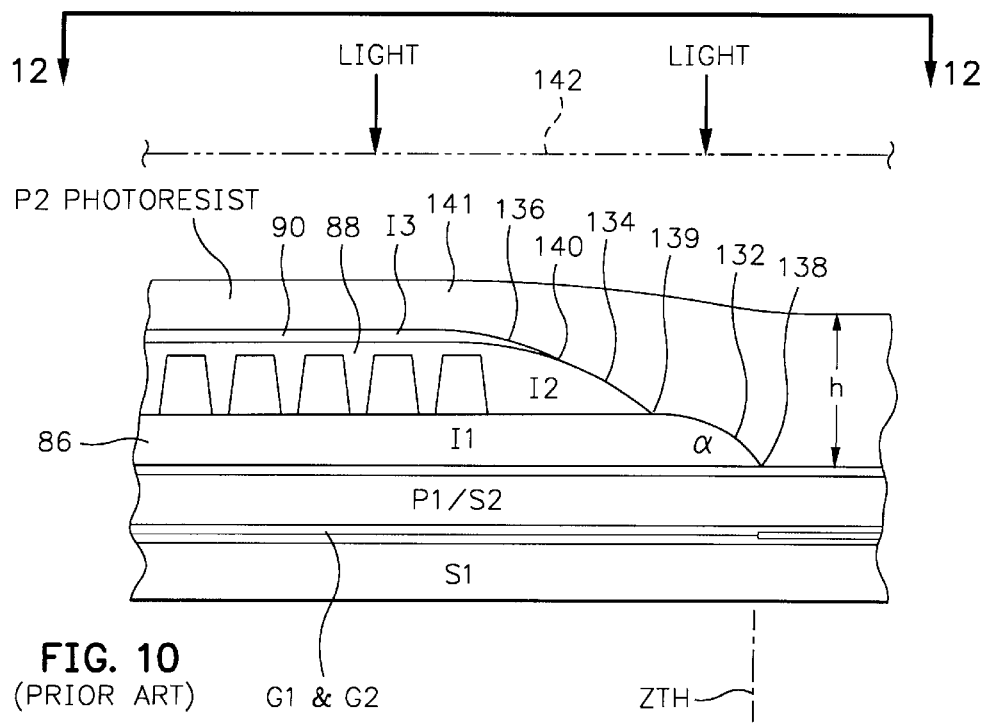
FIG. 10 is the same as FIG. 9 except a photo-patterning step is illustrated for constructing the second pole tip of the magnetic head.

FIG. 10 shows the prior art head of FIG. 9 during the step of constructing the second pole piece 94 (see FIG. 9). In FIG. 10 the first, second and third insulation layers 86, 88 and 90 are shown with sloping surfaces 132, 134 and 136 respectively, which terminate at apexes 138, 139 and 140 respectively. As stated hereinabove, the first, second and third insulation layers are hard-baked photoresist which results in the sloping surfaces 132, 134 and 136 being highly reflective to light. All of the sloping surfaces 132, 134 and 136 face the pole tip region where the second pole tip 100 of the second pole piece 94 is to be formed. As shown in FIG. 10, the second pole piece is formed with a photoresist layer 141 that is spun on top of the partially completed head. The height of the photoresist layer may be as much as 12 $\mu$m thick in the pole tip region and is typically approximately 4.5 $\mu$m thick above the third insulation layer 90. Since the flare point 130 of the second pole piece 94 (shown in FIGS. 9, 12 and 13) is located on the sloping surfaces of the insulation layers, light directed through a second pole-shaped opening (not shown) in a mask 142 will be reflected from the sloping surfaces forward toward the ABS into areas of the photoresist layer 141 adjacent the pole tip region. This causes the pole tip region to be wider than the opening in the mask 142. This is referred to as "reflective notching" and is illustrated in FIG. 12.

The photoresist pattern for the second pole piece is shown in FIG. 12 at 94' which comprises the second pole tip pattern 100' and the second pole piece yoke pattern 103'. This is referred to as the "P2 frame". Reflective notching of the photoresist layer 141 (see FIG. 10) by light reflected at an angle of incidence from the sloping layers of the insulation layers is shown at 144 and 146 in FIG. 12. When light ray A is directed downwardly during the photo-imaging step of the photoresist, it is reflected at an angle of incidence from the insulation stack into the pole tip region without causing any reflective notching of the second pole tip. However, light ray B from the photo-imaging process is reflected from the sloping surfaces of the insulation layers behind the flare point 130 at an angle of incidence into the photoresist 141 in a side region outside the intended pole tip pattern 100'. It is light reflection B and similar light reflections that cause the reflective notching shown in FIG. 12.

Figure 11:
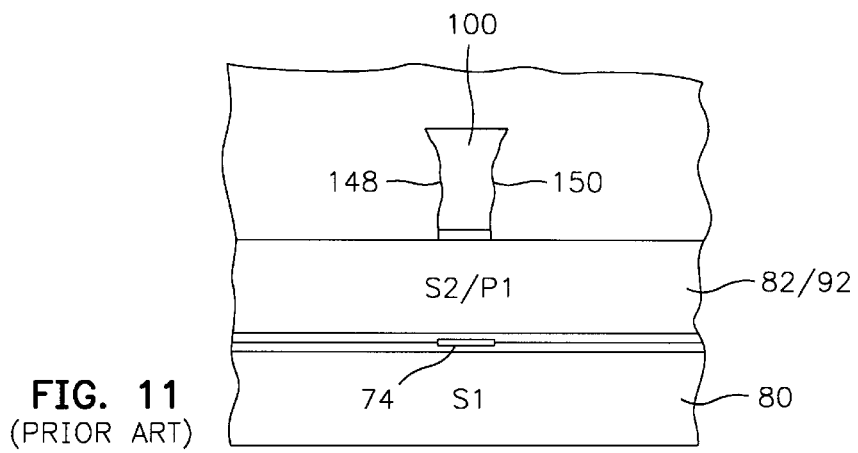
FIG. 11 is a view taken along plane 11—11 of FIG. 9.

When the second pole piece 94 is plated and the photoresist layer 141 is removed the head is complete, as shown in FIG. 9. However, the pole tip 100 is poorly formed, exhibiting irregular side walls 148 and 150, as shown in FIG. 11. Furthermore, photoresist notching results in a second pole tip 100 that has wider areas at the upper pole tip region than at the base of the pole tip (adjacent the write gap). If the irregular second pole tip 100 is used as a milling mask to notch the first pole tip 98, the wider regions of the second pole tip shadows the milling beam. Thus, the milling process is less effective at removing the first pole tip material directly beneath the side walls of the second pole tip. This results in a poorly formed P1 notched write head structure due to incomplete notching of the first pole piece 72. These poorly formed pole tips result in side writing of adjacent tracks.

The Invention

Figure 14:
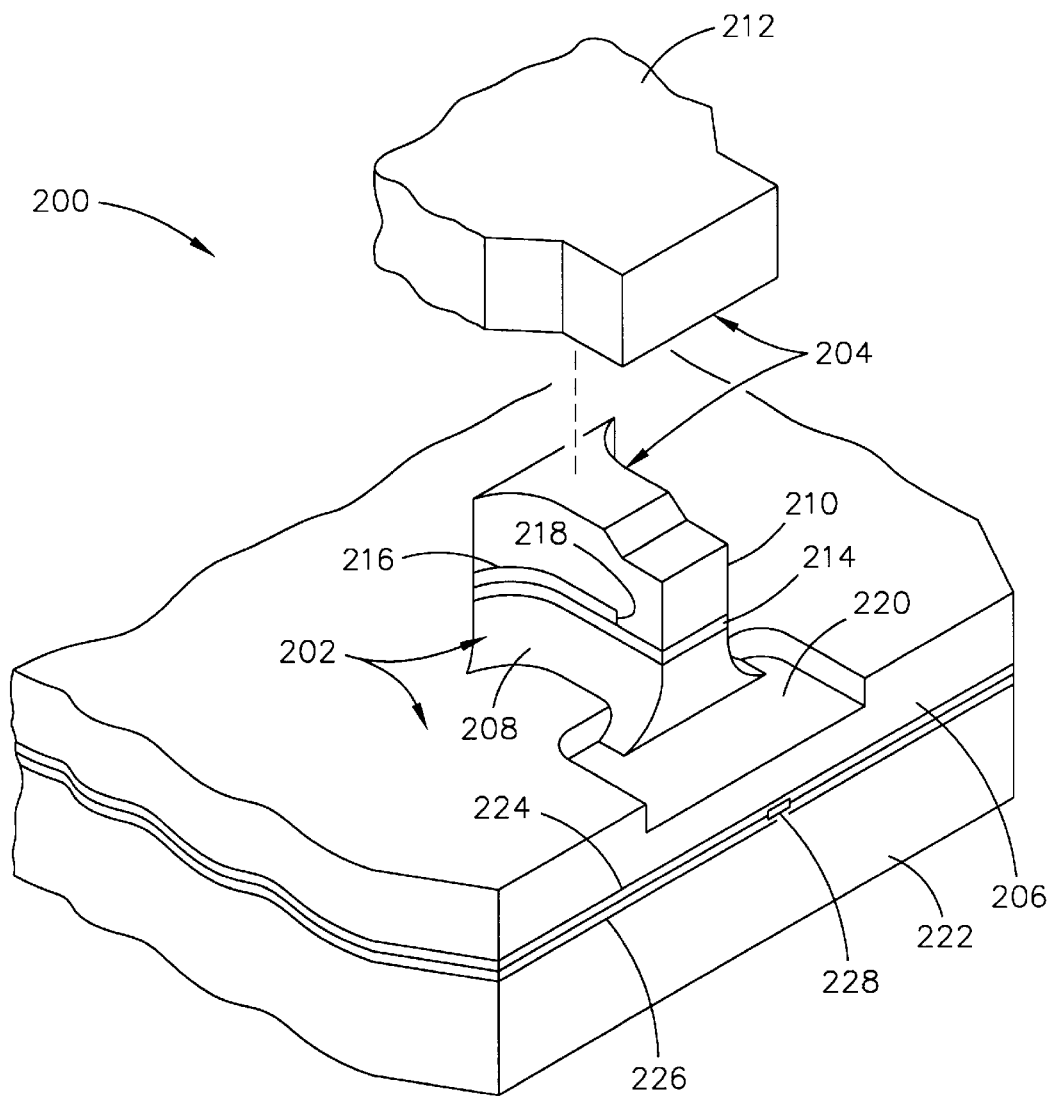
FIG. 14 is an isometric exploded illustration of the front portion of first and second pole tips of the present invention in a merged magnetic head.

FIG. 14 is an exploded isometric illustration of a front portion of a merged magnetic head 200 of the present invention showing some of the components of a front portion of the merged magnetic head. The merged magnetic head 200 includes first and second pole pieces 202 and 204 wherein the first pole piece has a bottom first pole piece layer 206 and a top first pole tip layer 208 with the top first pole tip layer being on the bottom first pole piece layer and wherein the second pole piece 204 has a bottom second pole piece layer 210 at a top second pole piece layer 212 with the top second pole piece layer being on the bottom second pole tip layer. A gap layer 214 is located between the top first pole tip layer and the bottom second pole tip layer and separates the top first pole tip layer and the bottom second pole tip layer from one another at an air bearing surface (ABS). A zero throat height (ZTH) defining layer 216 is located on the gap layer 214 between the top first pole tip layer 208 and the bottom second pole tip layer 210 and is recessed from the ABS toward a back gap of the merged magnetic head so as to further separate the top first pole tip layer and the bottom second pole tip layer from one another at a location that is recessed from the ABS. The ZTH defining layer 216 has a front edge 218 that defines the location of the ZTH of the first and second pole pieces 202 and 204. The ZTH is the location where the first and second pole pieces first commence to separate from one another after the ABS. The bottom first pole piece layer 206 has been notched at 220 adjacent the top first pole tip layer 208, which will be described in more detail hereinafter. The bottom first pole piece layer 206 is a common layer with a second shield (S2) of a read head portion of the merged magnetic head. The read head portion further includes a bottom shield layer (S1)

222 and first and second insulation layers 224 and 226 which are sandwiched between the first and second shield layers 222 and 206. Between the first and second read gap layers 224 and 226 is a read sensor 228, which may be a magnetoresistive (MR) sensor or a spin valve sensor, along with leads (not shown) which extend from the read sensor to terminals (not shown) located in a back portion of the head. The bottom first pole piece layer 206, the top first pole tip layer 208, and the bottom second pole tip layer 210 have front surfaces which are located at the ABS while the top second pole piece layer 212 has a front surface which may be located at the ABS or recessed therefrom, which will be described in more detail hereinafter. The aforementioned details of the write head portion, shown in FIG. 14, apply to a single coil embodiment and a double coil embodiment of the present invention which is discussed hereinafter.

Figure 15:
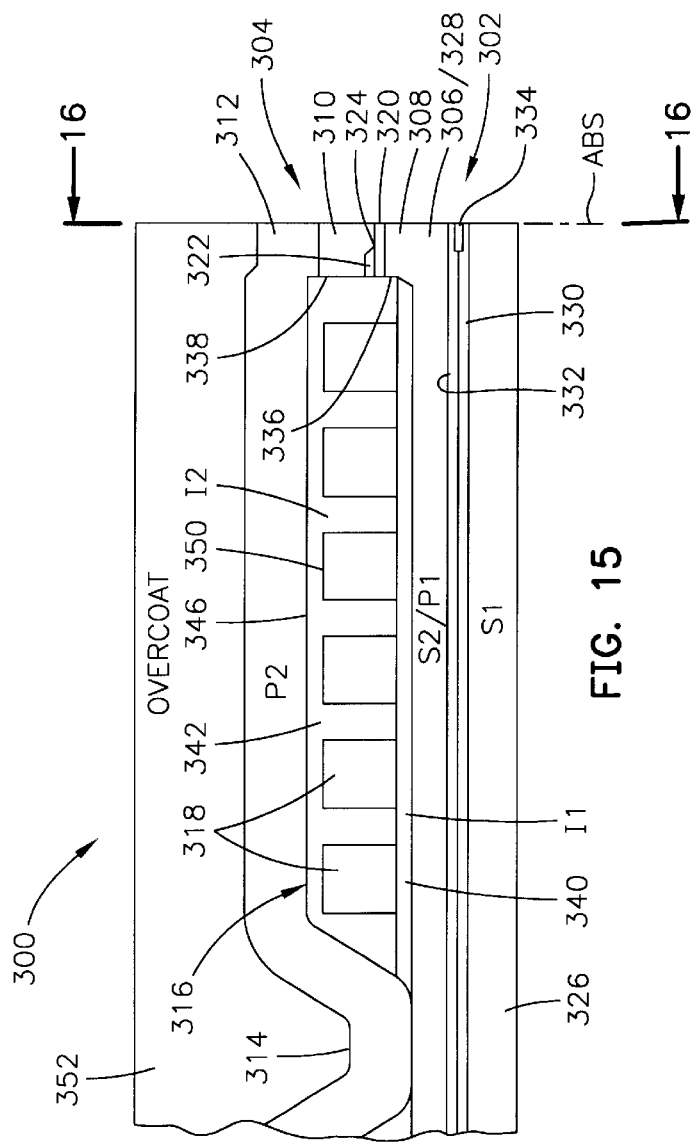
FIG. 15 is a longitudinal cross-sectional view of one embodiment of the present invention.

A longitudinal cross-sectional view of a single coil embodiment 300 of the present invention is shown in FIG. 15. The write head portion of this embodiment includes first and second pole pieces 302 and 304 wherein the first pole piece has a bottom first pole piece layer 306 and a top first pole tip layer 308 with the top first pole tip layer being on the bottom first pole piece layer and wherein the second pole piece has a bottom second pole tip layer 310 and a top second pole piece layer 312 with the top second pole piece layer being on the bottom second pole tip layer. The bottom first pole piece layer 306 and the top second pole piece layer 312 are connected at a back gap 314 and extend toward the ABS. An insulation stack 316 is located between the bottom first pole piece layer 306 and the top second pole piece layer 312 in a position between the ABS and the back gap 314 and has a coil layer 318 embedded therein.

The top first pole tip layer 308 and the bottom second pole tip layer 310 are located entirely between the ABS and a front end of the coil layer 318. A gap layer 320 is located between the top first pole tip layer 308 and the bottom second pole tip layer 310 and separates the top first pole tip layer and the bottom second pole tip layer from one another at the ABS. A zero throat height (ZTH) defining layer 322 is located on the gap layer between the top first pole tip layer 308 and the bottom second pole tip layer 310 and is recessed from the ABS toward the back gap so as to further separate the top first pole tip layer and the bottom second pole tip layer from one another at a front edge 324 that is recessed from the ABS toward the back gap so as to define a zero throat height of the head where the first and second pole pieces 302 and 304 first commence to separate from one another after the ABS.

The read head portion of the merged magnetic head includes a first shield layer 326 and a second shield layer 328 which is common with the bottom first pole piece layer 306 of the write head portion. First and second read gap insulation layers 330 and 332 are located between the first and second shield layers and a read sensor 334 is located between the first and second read gap layers 330 and 332. The read sensor 334 may be an MR sensor or a spin valve sensor, as desired.

Figure 16:
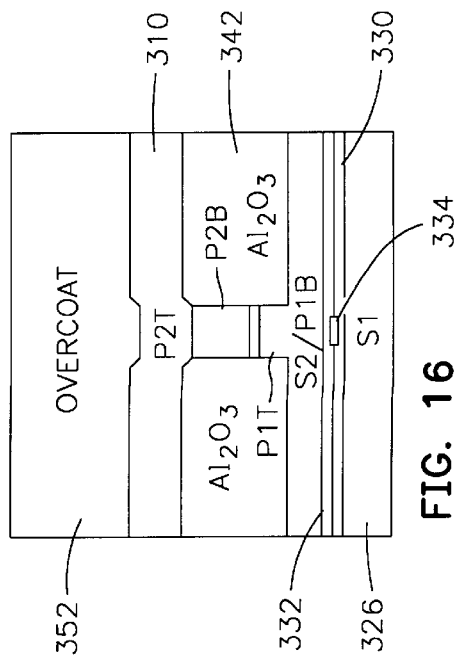
FIG. 16 is a view taken along plane 16—16 of FIG. 15.

The top first pole tip layer 308 and the bottom second pole tip layer 310 have back walls 336 and 338 that further separate the first and second pole pieces 302 and 304 from one another. The first separation at the ZTH, caused by the front edge 324 of the ZTH defining layer, decreases flux leakage between the first and second pole pieces and the back walls 336 and 338 of the top first pole tip layer and the bottom second pole tip layer further decrease flux leakage between the pole pieces. The insulation stack 316 preferably includes first and second insulation layers (I1) 340 and (I2) 342, wherein the first insulation layer 340 is located between the bottom first pole piece layer 308 and the coil layer 318 and the second insulation layer 342 is located between the coil layer 318 and the top second pole piece layer. The first insulation layer 340 may be baked photoresist or other insulative material, such as alumina or silicon dioxide. The second insulation layer 342 is preferably alumina or silicon dioxide and has a top flat surface 346. With this arrangement, the top second pole piece layer 312 is substantially flat from or near the ABS until it slopes downwardly to make connection with the bottom first pole piece layer 306 at the back gap 314. The top second pole piece layer 312 is shown recessed from the ABS, however, it may be located at the ABS, if desired. An overcoat layer 352 covers the top second pole piece layer 312 to complete the merged magnetic head 300. An ABS illustration of the merged magnetic head 300 shown in FIG. 15 is shown in FIG. 16. The coil layer 318 has a top surface 350 which is lower than the top surface of the bottom second pole tip layer.

FIG. 17 illustrates a double coil embodiment 400 of the present merged magnetic head. The embodiment 400 has first and second pole pieces 402 and 404 where the first pole piece has a bottom first pole piece layer 406 and a top first pole tip layer 408 with the top first pole tip layer being on the bottom first pole piece layer and wherein the second pole piece 404 has a bottom second pole tip layer 410 and a top second pole piece layer 412 with the top second pole piece layer being on the bottom second pole tip layer. The bottom first pole piece layer 406 and the top second pole piece layer 412 are connected at a back gap 414 and extend toward the ABS. An insulation stack 416 is located between the bottom first pole piece layer 406 and the top second pole piece layer 412 in a position between the ABS and the back gap 414 and has first and second coil layers 417 and 418 embedded therein. As in the first embodiment, the top first pole tip layer 408 and the bottom second pole tip layer 410 are located entirely between the ABS and a front end of the coil layer 417. The top of the first coil layer 417 is located below the top of the bottom second pole tip layer 410. A gap layer 419 is located between the top first pole tip layer 408 and the bottom second pole tip layer 410 and separates the top first pole tip layer and the bottom second pole tip from one another at the ABS. A zero throat height (ZTH) defining layer 420 is on the gap layer 418 between the top first pole tip layer and the bottom second pole tip layer and has a front edge 422 that is recessed from the ABS toward the back gap 414 so as to further separate the top first pole tip layer 408 and the bottom second pole tip layer 410 from one another and define the zero throat height of the head where the first and second pole pieces first commence to separate from one another after the ABS.

The insulation stack 416 preferably includes first, second and third insulation layers (I1) 424, (I2) 426 and (I3) 428 with the first insulation layer 424 being located between the bottom first pole piece layer 406 and the first coil layer 417, the second insulation layer 426 being located between the first and second coil layers 417 and 418 and the third insulation layer 428 being located between the second coil layer 418 and the top second pole piece layer 412. The first, second and third insulation layers are preferably baked photoresist. The top second pole piece layer 412 is shown at the ABS, however, optionally it may be recessed from the ABS. FIG. 18 is an ABS illustration of FIG. 17.

As shown in FIGS. 17 and 18, each of the top first pole tip layer 408, the bottom second pole tip layer 410, the gap layer 418 and the ZTH defining layer 420 have a front surface at the ABS and a back surface recessed from the ABS joined by first and second side surfaces. The front and back surfaces and the first and second side surfaces of the top first pole tip layer 408, the bottom second pole tip layer 410 and the gap layer 418 are substantially aligned with respect to one another.

The ZTH defining layer 322 of the embodiment 300 in FIG. 15 has a thickness which is preferably greater than the thickness of the gap layer 320, such as twice the thickness of the gap layer. In one embodiment of the invention, each of the write gap layer 320 and ZTH defining layer 322 are preferably alumina, and in another embodiment of the invention each of the write gap layer 320 and the ZTH defining layer 322 are a non-magnetic electrically conducting material such as nickel phosphorous (NiP). In still another embodiment of the invention, the top first pole tip layer 308 and the bottom second pole tip layer 310 are constructed of a material that has a magnetic moment that is higher than the magnetic moment of the material of either of the bottom first pole piece layer 306/328 and the top second pole piece layer 312. In a preferred embodiment, the material of the top first pole tip layer 308 and the bottom second pole tip layer 310 are nickel iron ($Ni_{45}Fe_{55}$), and the material of the bottom first pole piece layer 306/328 and the top second pole piece layer 312 are nickel iron ($Ni_{80}Fe_{20}$). The higher magnetic moment material permits the top first pole tip layer and the bottom second pole tip layers to carry a higher flux density without saturation. These various modifications also apply to the embodiment 400 shown in FIG. 17.

Figure 19A:
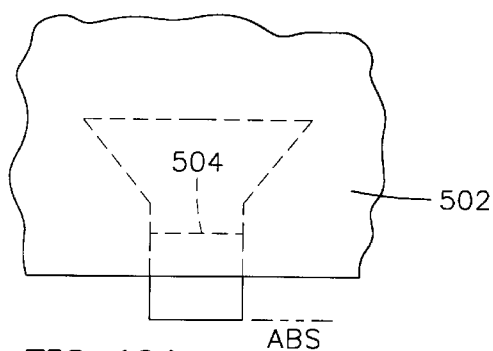
FIG. 19A is a planar view of a partially flared bottom second pole tip connected to a recessed top pole piece layer.
Figure 19C:
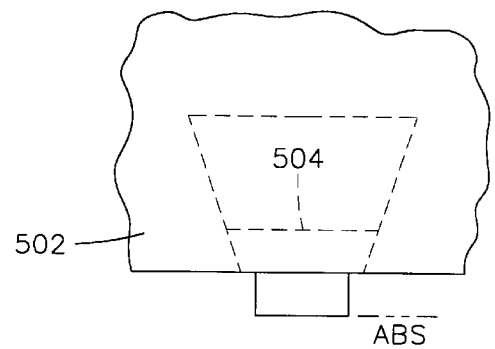
FIG. 19C is a planar view of a flared bottom second pole tip connected to a recessed top second pole piece layer.
Figure 19B:
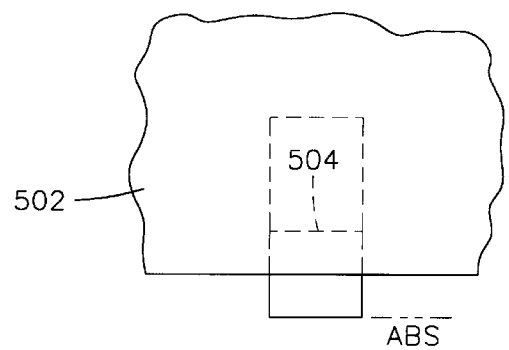
FIG. 19B is a planar illustration of a rectangular bottom second pole tip connected to a recessed top second pole piece layer.

FIGS. 19A–19C illustrate an aspect of the first and second pole pieces wherein the top second pole piece layer 502 is recessed from the ABS. In each of FIGS. 19A, 19B and 19C the front edge 504 of the ZTH defining layer defines the ZTH of the head. In FIG. 19A, the bottom second pole tip layer 506 and underlying top first pole tip layer (not shown) comprise a straight portion and a flared portion. In FIG. 19B the pole tip layers are substantially rectangular. In FIG. 19C a back portion of the pole tip layers are flared outwardly toward the back gap.

Figure 20A:
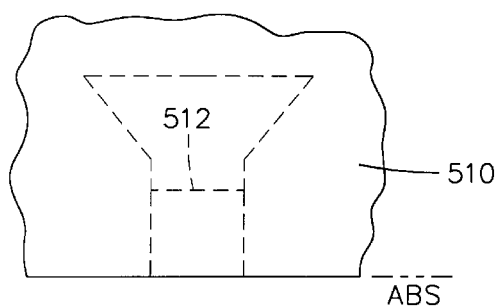
FIG. 20A is a partially flared bottom second pole tip connected to a top second pole piece layer at the ABS.
Figure 20C:
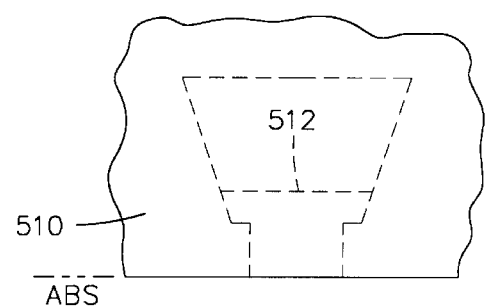
FIG. 20C is a planar view of a flared bottom second pole tip connected to a top second pole piece layer at the ABS.
Figure 20B:
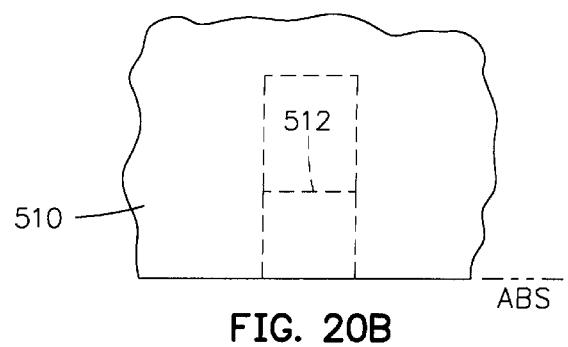
FIG. 20B is a rectangular bottom second pole tip connected to a top second pole piece layer at the ABS.

FIGS. 20A–20C illustrate a further aspect of the present invention wherein the top second pole piece layer 510 is located at the ABS. In each of FIGS. 20A, 20B and 20C the front edge 512 of the ZTH defining layer defines the ZTH of the head. In FIG. 20A the pole tip layers comprise a rectangular portion and a flared portion. In FIG. 20B the pole tip layers are rectangular and in FIG. 20C a back portion of the pole tip layers flare toward the back gap.

Method of Making

Figure 21A:
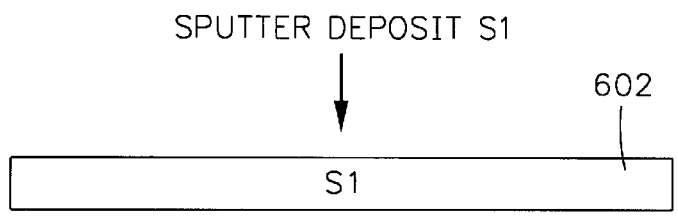
FIG. 21A is an ABS illustration of a deposition of a first shield layer in the construction of a merged magnetic head employing the present invention.
Figure 22A:
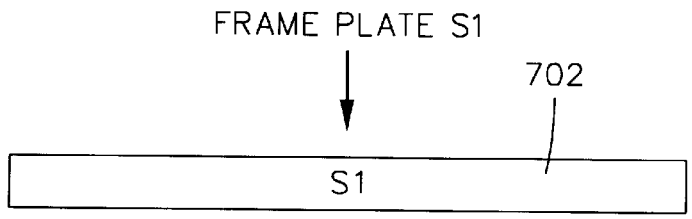
FIG. 22A is an ABS illustration of frame plating a first shield layer in the construction of a merged magnetic head employing the present invention.

Methods of making the embodiment of the invention shown in FIG. 15 are illustrated in FIGS. 21A–21AD and FIGS. 22A–22AD. The first method of making, illustrated in FIGS. 21A–21AD, is primarily a dry process where most of the metallic layers are sputter deposited on a wafer whereas the second embodiment, illustrated in FIGS. 22A–22AD, is primarily a wet process wherein the metallic layers, including the gap layer and the ZTH defining layer, are plated.

The aforementioned sputter deposition is implemented in a vacuum chamber wherein a target of desired material is sputtered onto a substrate via a plasma in the chamber wherein a potential is applied between the target and the substrate. Plating is a wet process wherein the wafer is placed in an electrolyte and a potential is applied between the surface to be plated and a plating material. Metallic ions from the plating material are then deposited on the desired surface. Masking is accomplished by photoresist masks which are spun onto the wafer, imaged with light where portions of the photoresist layer are to be removed and then the portions are removed by a developer. After the desired layer is deposited through openings in the photoresist mask, the mask is then stripped by a dissolvent. Masking, followed by plating, is known in the art as frame plating. Layer portions may be removed by ion milling which is particle bombardment of the layer with ions. Many of the figures are referred to as ABS views, however, these views are, in essence, views of ABS sites, since the ABS is not formed until after rows and columns of magnetic heads on a wafer are cut into rows and lapped.

Figure 21B:
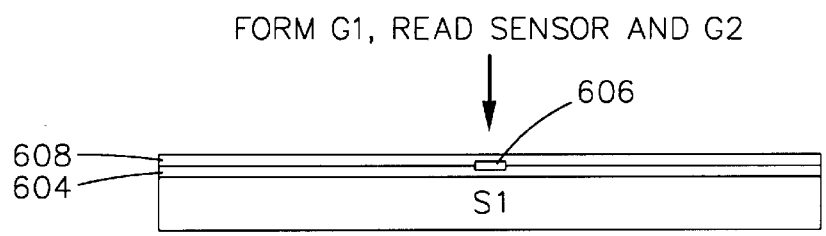
FIG. 21B is the same as FIG. 21A except a first read gap layer, a read sensor, lead layers and a second read gap layer have been formed.
Figure 21C:
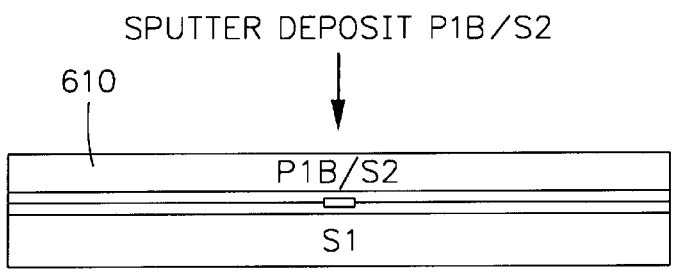
FIG. 21C is the same as FIG. 21B except a bottom first pole piece layer has been sputter deposited.
Figure 21D:
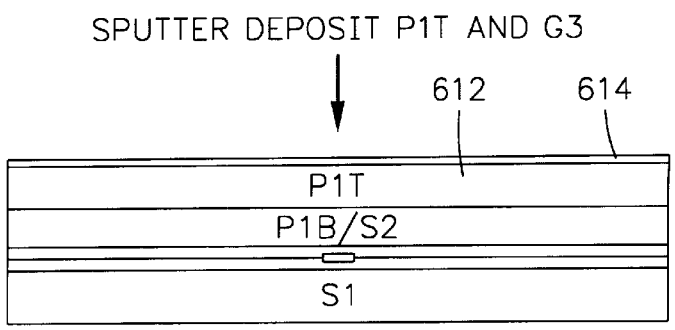
FIG. 21D is the same as FIG. 21C except a top first pole piece layer and a write gap layer have been deposited.

Rows and columns of merged magnetic heads (not shown) may be simultaneously constructed on a wafer, the construction of one of the magnetic heads being described in FIGS. 21A–21AD. FIG. 21A is an ABS illustration of a partially completed head wherein a first shield layer 602 has been sputter deposited. FIG. 21B is the same as FIG. 21A except a first read gap layer (G1) 604, a read sensor 606, first and second lead layers (not shown) and a second read gap layer 608 are formed wherein all these layers are sputter deposited except the read sensor and the lead layers. FIG. 21C is the same as FIG. 21B except a second shield layer 610, which is common with a bottom first pole piece layer (S2/P1B), is sputter deposited. FIG. 21D is the same as FIG. 21C except a top first pole tip layer 612 and a write gap layer 614 have been sputter deposited.

Figure 21E:
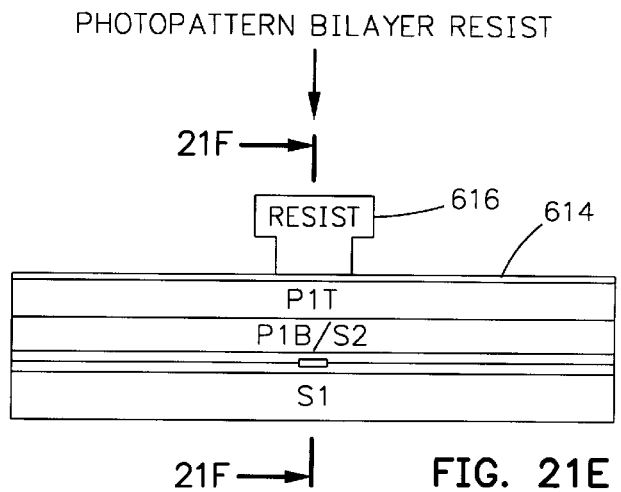
FIG. 21E is the same as FIG. 21D except a bilayer resist layer has been photopatterned.
Figure 21F:
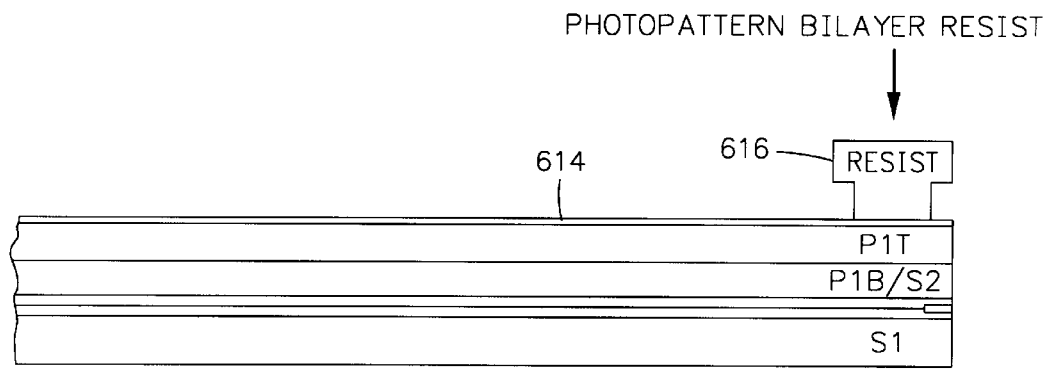
FIG. 21F is a view taken along plane 21F—21F of FIG. 21E.
Figure 21G:
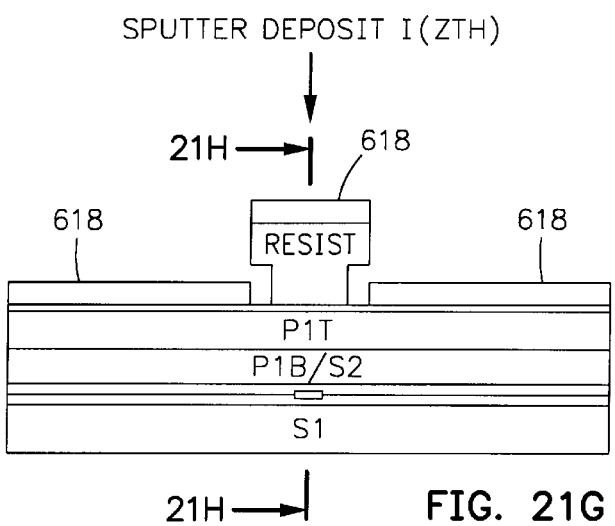
FIG. 21G is the same as FIG. 21E except a zero throat height (ZTH) defining layer has been sputter deposited.
Figure 21H:
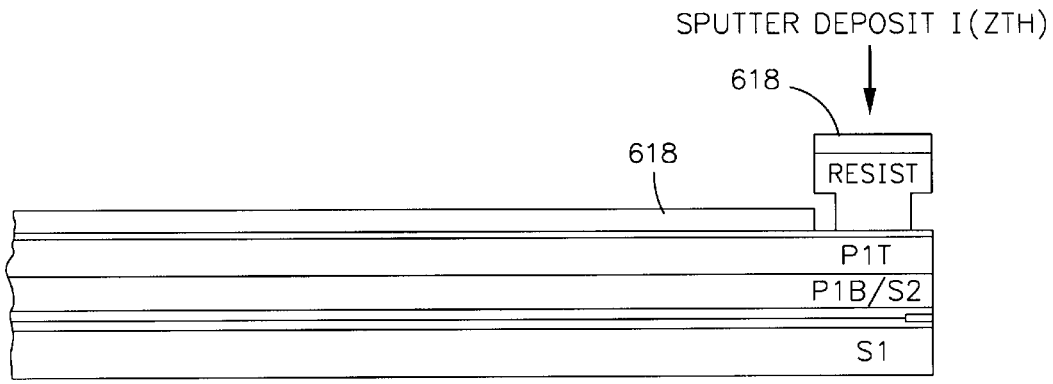
FIG. 21H is a view taken along plane 21H—21H of FIG. 21G.
Figure 21I:
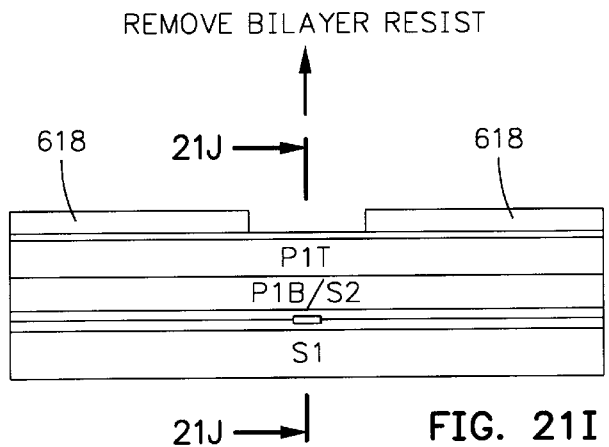
FIG. 21I is the same as FIG. 21G except the bilayer resist has been removed.
Figure 21J:
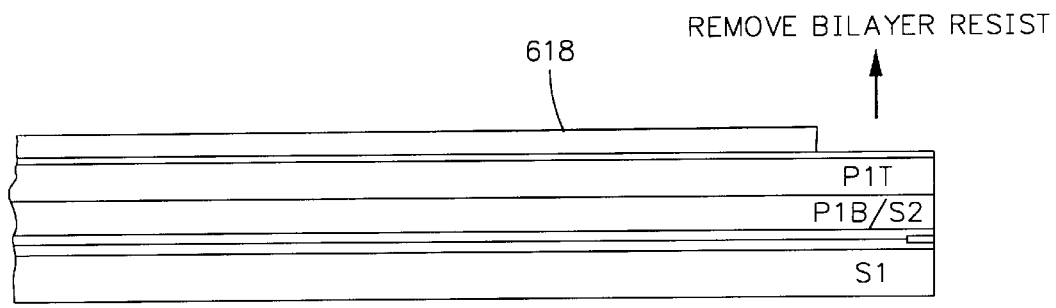
FIG. 21J is a view taken along plane 21J—21J of FIG. 21I.
Figure 21K:
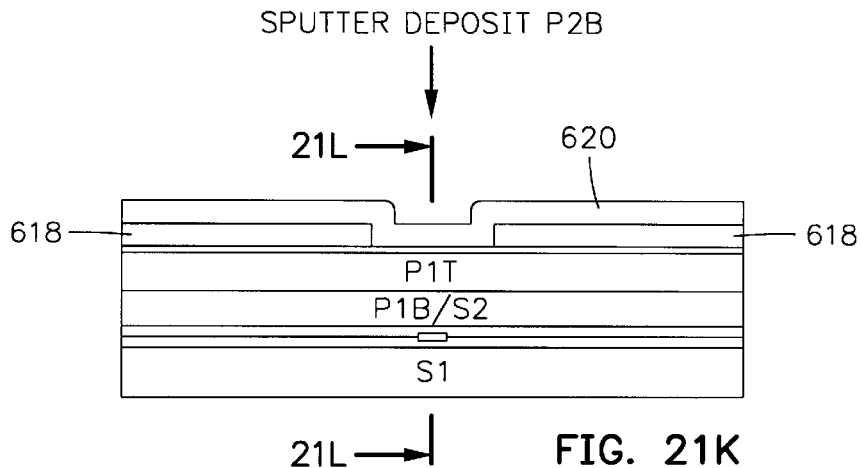
FIG. 21K is the same as FIG. 21I except a bottom second pole tip layer has been sputter deposited.
Figure 21L:
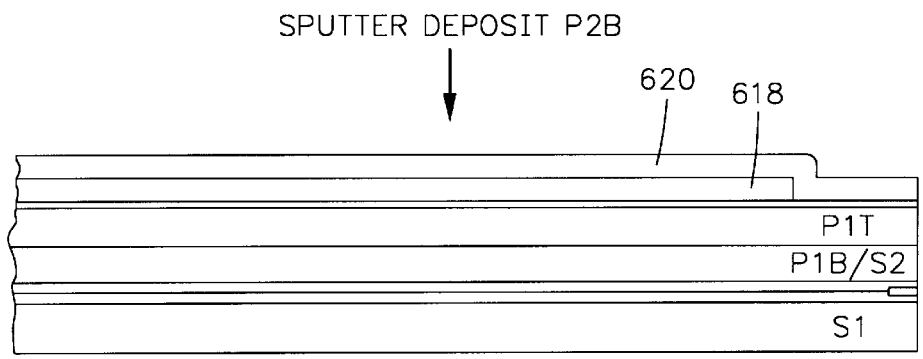
FIG. 21L is a view taken along plane 21L—21L of FIG. 21K.

FIG. 21E is the same as FIG. 21D except a bilayer photoresist layer 616 has been photopatterned on top of the write gap layer 614. The bilayer photoresist layer 616 is constructed by spinning two different types of photoresist on the wafer wherein the bottom photoresist layer is preferentially etched at a greater rate than the top photoresist layer. After a light exposure step, a developer removes the light exposed photoresist and preferentially etches the bottom layer to provide the undercut, as shown in FIG. 21E. FIG. 21F shows the configuration of the bilayer photoresist in a pole tip region of the head. FIG. 21G is the same as FIG. 21E except a ZTH insulation layer ($I_{ZTH}$) 618 has been sputter deposited on the wafer covering the partially completed head, as well as the top of the bilayer photoresist. FIG. 21H shows this coverage, as seen in the pole tip region of the head. FIGS. 21I and 21J are the same as FIGS. 21G and 21H, respectively, except the bilayer photoresist has been removed. FIGS. 21K and 21L are the same as FIGS. 21I and 21J, respectively, except a bottom second pole tip layer 620 has been sputter deposited on the wafer.

Figure 21M:
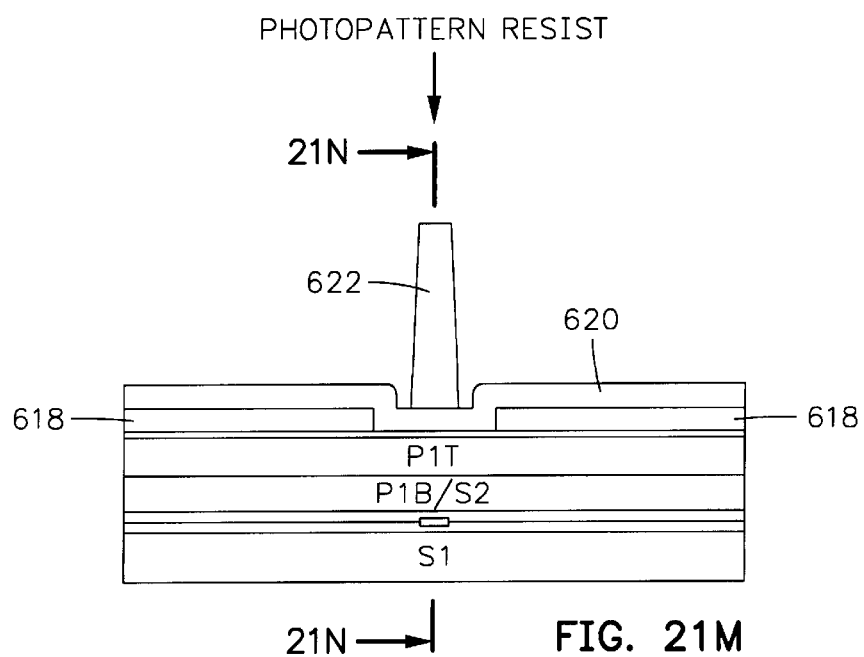
FIG. 21M is the same as FIG. 21K except a resist layer has been photopatterned.
Figure 21N:
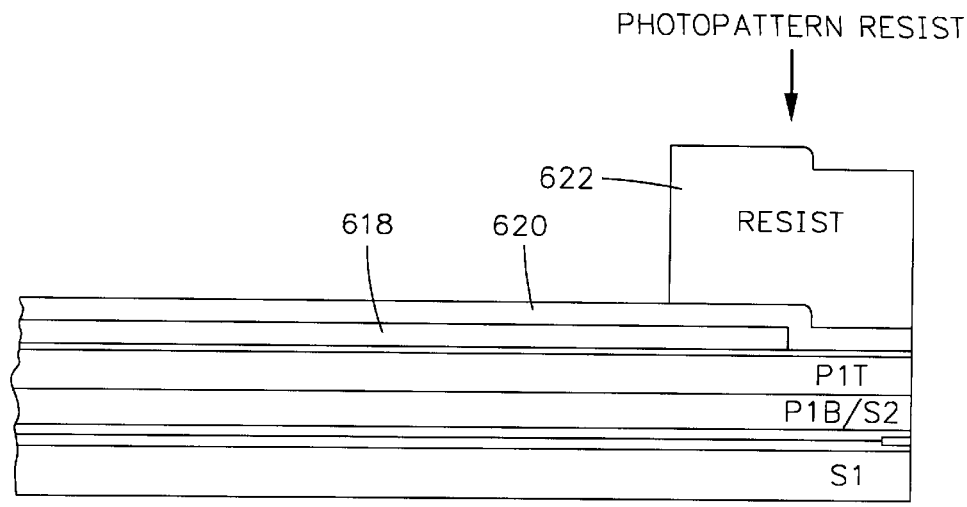
FIG. 21N is a view taken along plane 21N—21N of FIG. 21M.
Figure 21:
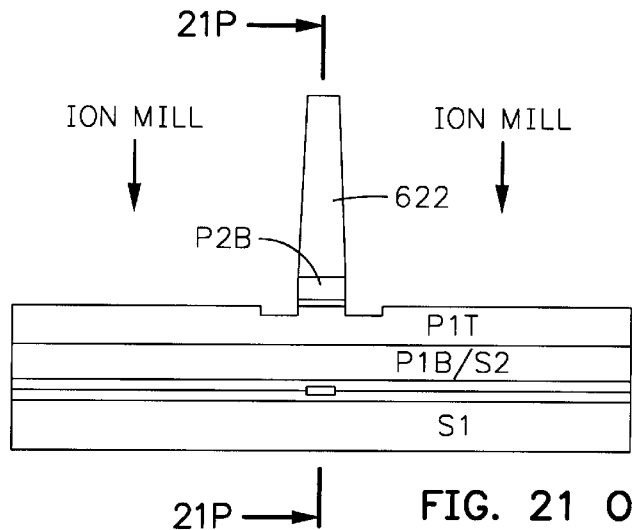
FIG. 21O is the same as FIG. 21N except ion milling has been partially completed.
FIG. 21P is a view taken along plane 21P—21P of FIG. 21O.
FIG. 21Q is the same as FIG. 21O except ion milling has been completed.
FIG. 21R is a view taken along plane 21R—21R of FIG. 21Q.
FIG. 21S is the same as FIG. 21Q except the resist layer has been removed.
FIG. 21T is a view taken along plane 21T—21T of FIG. 21S.
FIG. 21U is the same as FIG. 21T except a first insulation layer of an insulation stack and a coil layer has been sputter deposited.
FIG. 21V is the same FIG. 21S except an alumina layer has been deposited.
FIG. 21W is a view taken along plane 21W—21W of FIG. 21V.
FIG. 21X is the same as FIG. 21V except the alumina layer has been chemically mechanically polished (CMP)
FIG. 21Y is a view taken along plane 21Y—21Y of FIG. 21X.
FIG. 21Z is the same as FIG. 21Y except a resist layer has been photopatterned and ion milling has been implemented to remove the gap layer at the back gap.
Figure 21P:
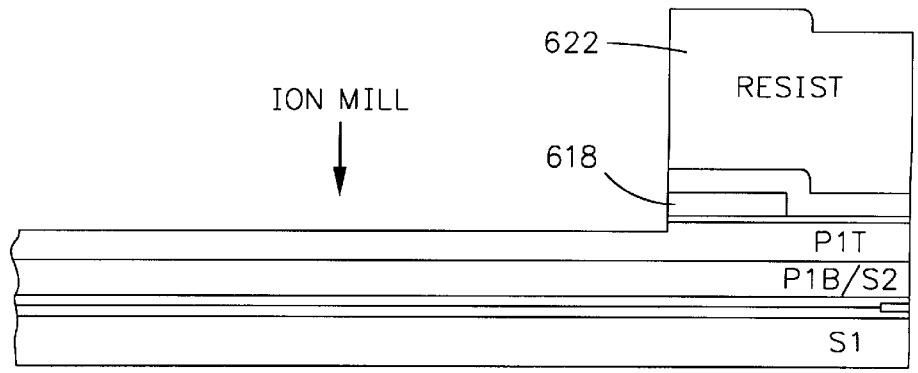
Figure 21Q:
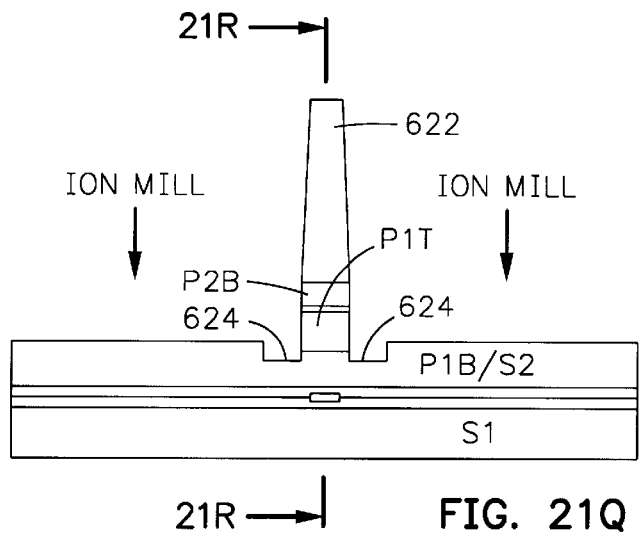
Figure 21R:
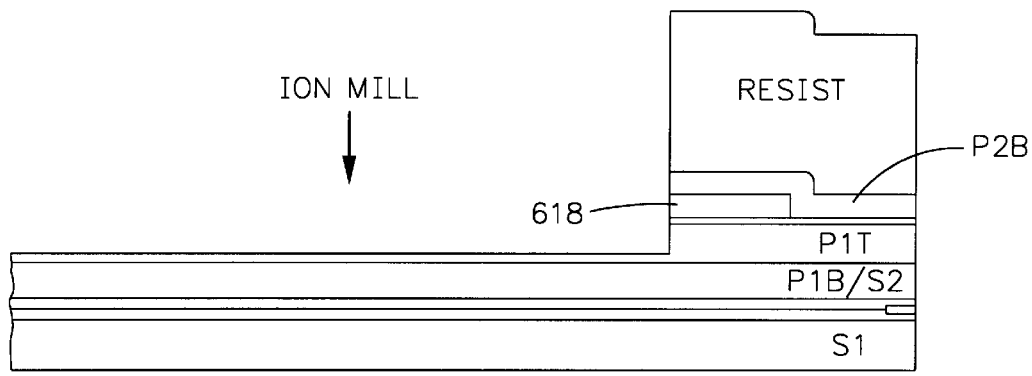
Figure 21S:
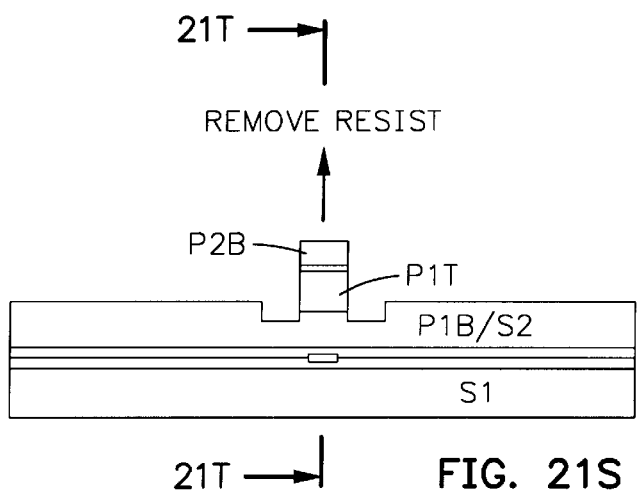
Figure 21T:
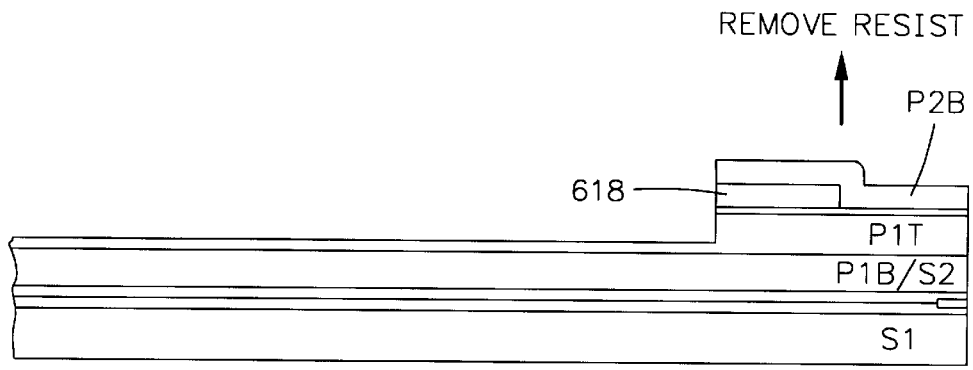

FIGS. 21M and 21N are the same as FIGS. 21K and 21L except resist has been spun on the wafer, light exposed and developed to produce the photopatterned photoresist layer 622. FIGS. 21O and 21P are the same as FIGS. 21M and 21O except ion milling has been implemented and has partially removed some of the layers. FIGS. 21Q and 21R are the same as FIGS. 21O and 21P except the ion milling has been completed causing a notching 624 of the bottom first pole tip layer adjacent first and second side edges of the top first pole tip layer. It should be noted that use of the ZTH defining layer 618, shown in FIGS. 21M and 21N, has protected the top surface of the bottom first pole piece layer 610 from thinning due to ion milling except at the notches 624. It can be seen from FIG. 21O that the ZTH defining layer 618 has set in motion notches for the bottom first pole piece layer 610 without reducing the thickness of the bottom first pole piece layer in first and second field locations outwardly from the notches 624. Accordingly, the present process assures that the first and second lead layers (not shown), which underlie the bottom first pole tip layer, have proper coverage by the bottom first pole piece layer 610. Notching of the bottom first pole piece layer at 624, as shown in FIG. 21Q, will improve the track writing capability of the write head portion of the merged MR head. FIGS. 21S and 21T are the same as FIGS. 21Q and 21R except the photoresist layer has been removed.

Figure 21U:
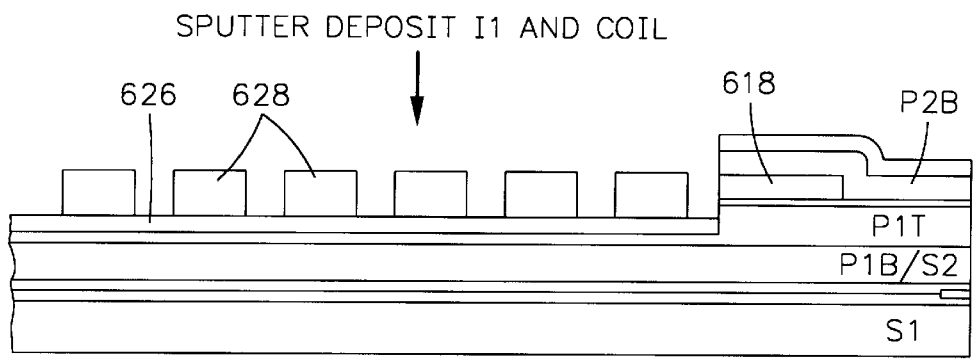
Figure 21V:
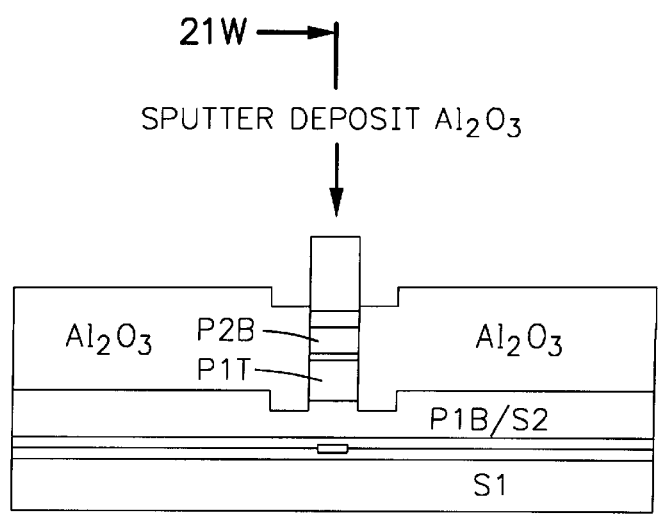
Figure 21W:
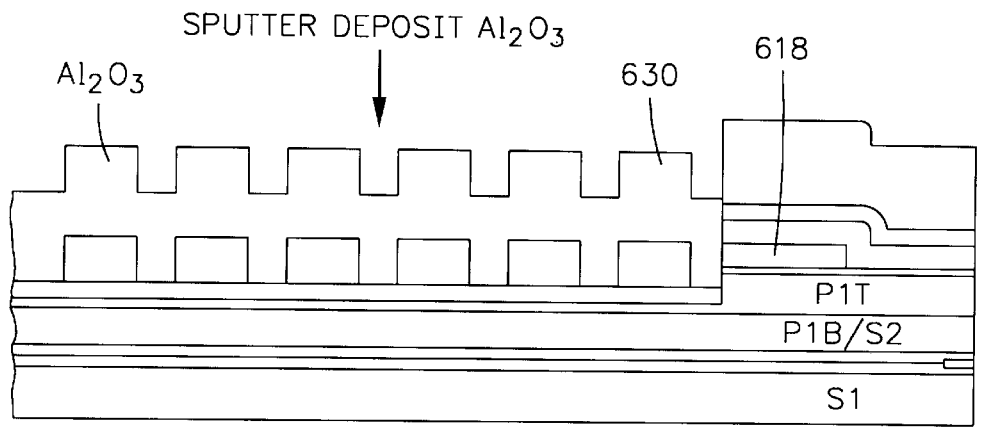
Figure 21X:
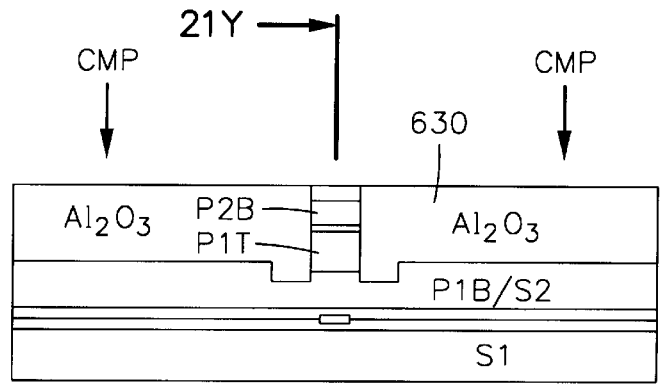
Figure 21Y:
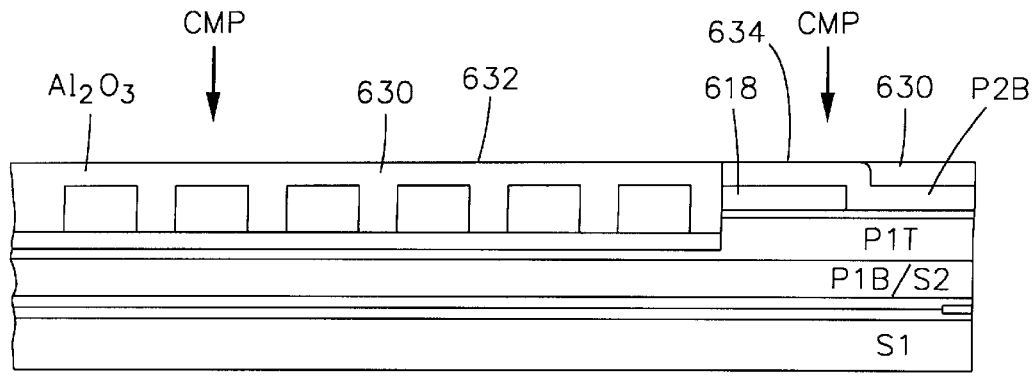
Figure 21A:
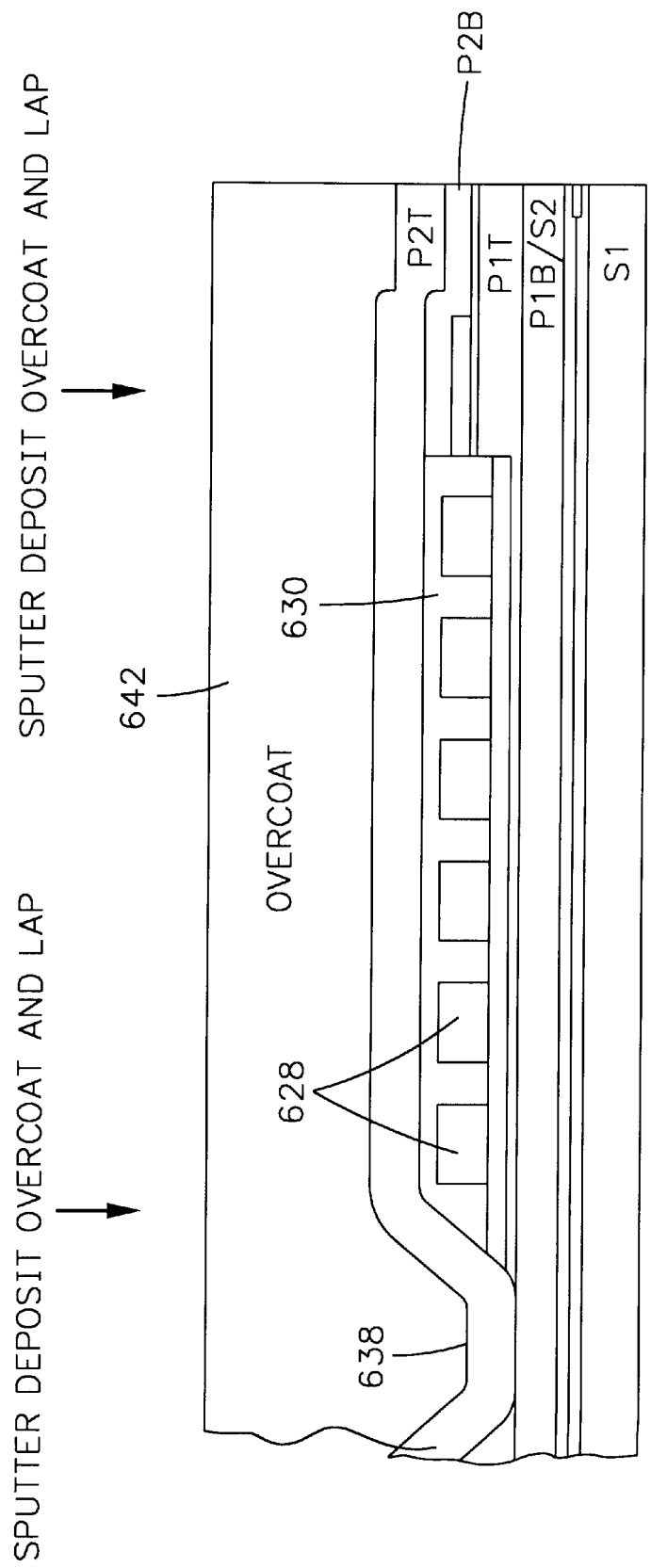

In FIG. 21U a first insulation layer 626 of an insulation stack has been sputter deposited on the bottom first pole tip layer followed by sputter deposition of a coil layer 628 on the first insulation layer. These sputter deposition steps may be accomplished by appropriately photopatterning bilayer photoresist similar to that shown in FIGS. 21E and 21F. After forming the bilayer photoresist the material is sputter deposited and the bilayer photoresist is lifted off when a dissolvent dissolves the lower layer of the bilayer photoresist. FIG. 21V is the same as FIG. 21S except alumina 630 is sputter deposited on the wafer after the coil layer is constructed, as shown in FIG. 21U. FIG. 21W is a view taken along plane 21W—21W of FIG. 21V showing a longitudinal cross-sectional view of the partially completed head after sputter depositing the alumina. FIGS. 21X and 21Y are the same as FIGS. 21V and 21W except the alumina layer has been chemically mechanically polished (CMP) until the alumina layer 630 has a top surface 632 that is flush with a top surface 634 of the bottom second pole tip layer. CMP is a lapping or grinding step which employs a slurry which preferentially etches the alumina as compared to the nickel iron of the bottom second pole tip layer. By appropriately adjusting the ph of the slurry the alumina can be preferentially etched during the lapping of the wafer.

FIG. 21Z is the same as FIG. 21Y except a photoresist layer 636 has been photopatterned and chemical etching has been implemented to remove the gap layer at the back gap 638. FIG. 21AA is the same as FIG. 21X except a top second pole tip layer 640 has been sputter deposited. FIG. 21AB is a view taken along plane 21AB—21AB of FIG. 21AA showing the sputter deposition of the top second pole tip layer. It should be noted that the top second pole tip layer 640 is substantially planar from the ABS until it dips down to make connection with the bottom first pole tip layer at the back gap 638. Because of the construction of the pedestal-type pole tip layers 612 and 620, the coil layer 628 is recessed lower than prior art coil layers allowing the planarization of the top second pole piece layer 640. It should be noted that the first insulation layer 626 of the insulation stack may optionally be constructed of baked photoresist. The merged magnetic head is completed in FIGS. 21AC and 21AD by sputter deposition of an overcoat layer 642 which may be alumina.

Figure 22B:
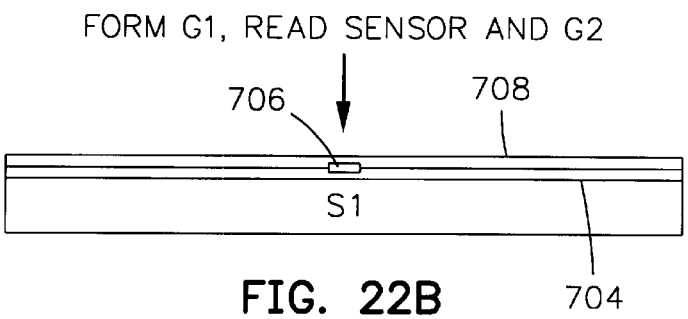
FIG. 22B is the same as FIG. 22A except a first read gap layer, a read sensor, lead layers and a second read gap layer have been formed.
Figure 22C:
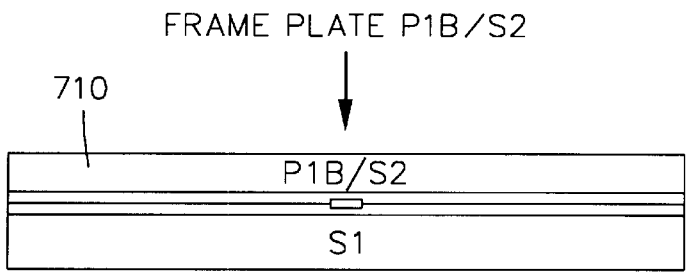
FIG. 22C is the same as FIG. 22B except a bottom first pole piece layer has been frame plated.
Figure 22D:
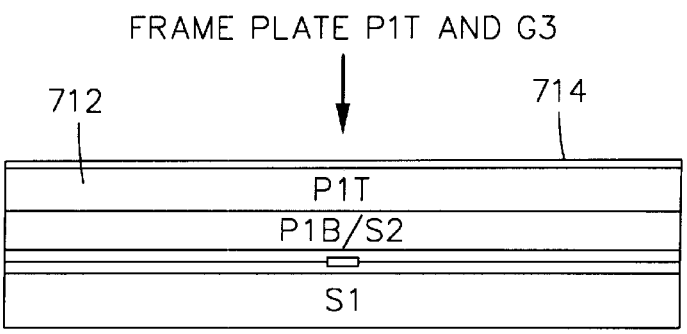
FIG. 22D is the same as FIG. 22C except a top first pole piece layer and a write gap layer have been plated.

FIGS. 22A–22AD illustrate a method of making another embodiment of the present magnetic head. FIG. 22A is an ABS illustration of a partially completed head wherein a first shield layer 702 has been frame plated. FIG. 22B is the same as FIG. 22A except a first read gap layer (G1) 704, a read sensor 706, first and second lead layers (not shown) and a second read gap layer 708 are formed wherein all these layers are sputter deposited, except the read sensor and the lead layers which are frame plated. FIG. 22C is the same as FIG. 22B except a second shield layer 710, which is common with a bottom first pole piece layer (S2/P1B), is frame plated. FIG. 22D is the same as FIG. 22C except a top first pole tip layer 712 and a write gap layer 714 have been frame plated.

Figure 22E:
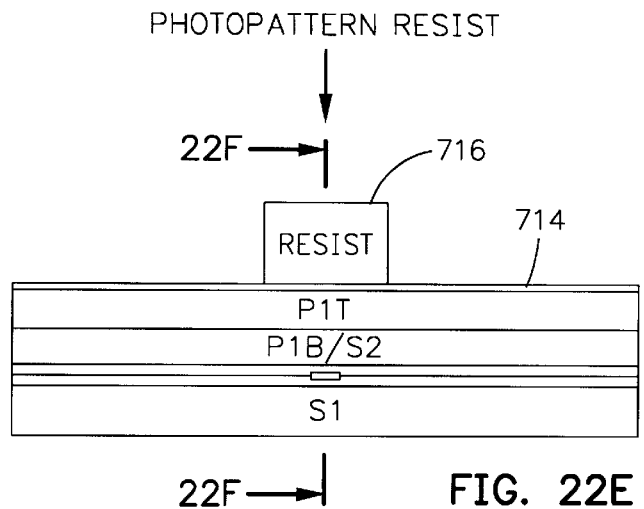
FIG. 22E is the same as FIG. 22D except a resist layer has been photopatterned.
Figure 22F:
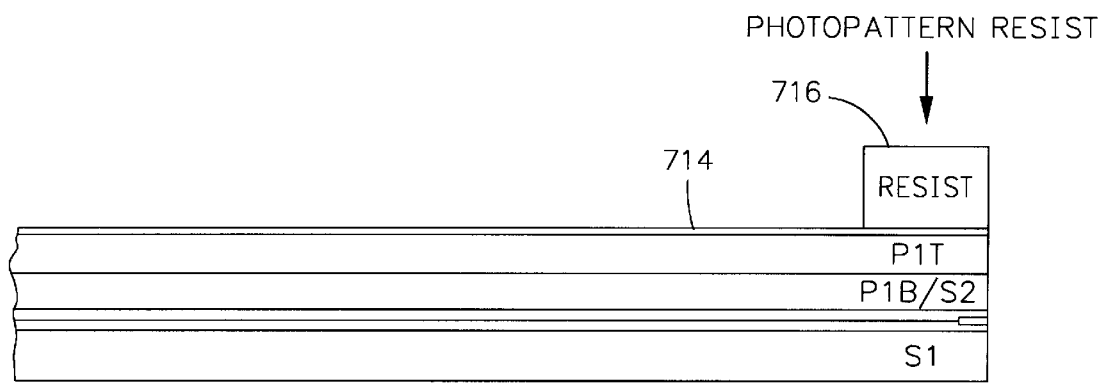
FIG. 22F is a view taken along plane 22F—22F of FIG. 22E.
Figure 22G:
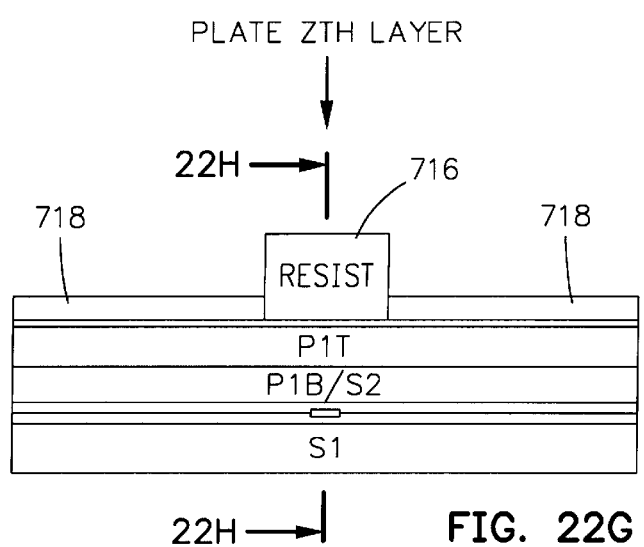
FIG. 22G is the same as FIG. 22E except a zero throat height (ZTH) defining layer has been plated.
Figure 22H:
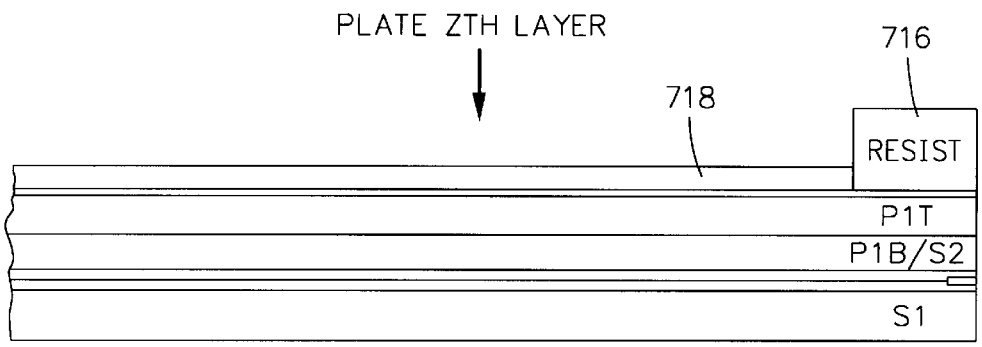
FIG. 22H is a view taken along plane 22H—22H of FIG. 22G.
Figure 22I:
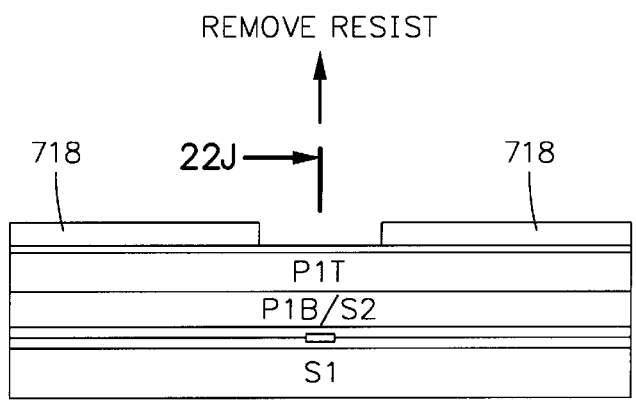
FIG. 22I is the same as FIG. 22G except the resist has been removed.
Figure 22J:
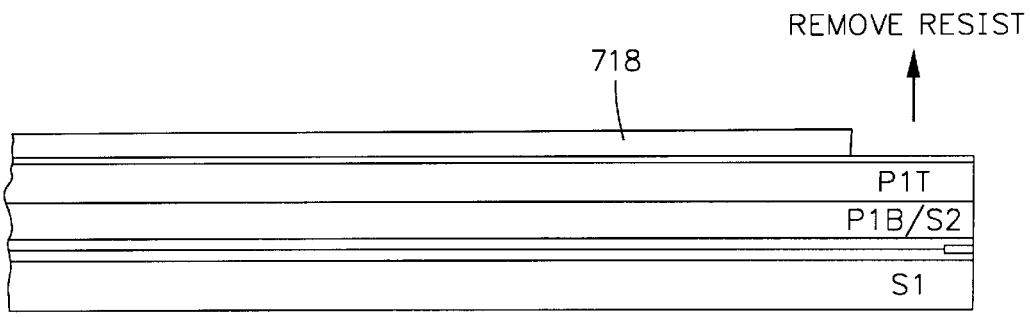
FIG. 22J is a view taken along plane 22J—22J of FIG. 22I.
Figure 22K:
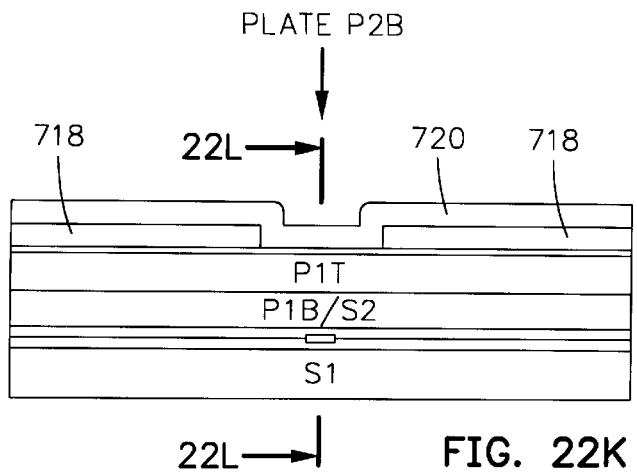
FIG. 22K is the same as FIG. 22I except a bottom second pole tip layer has been frame plated.
Figure 22L:
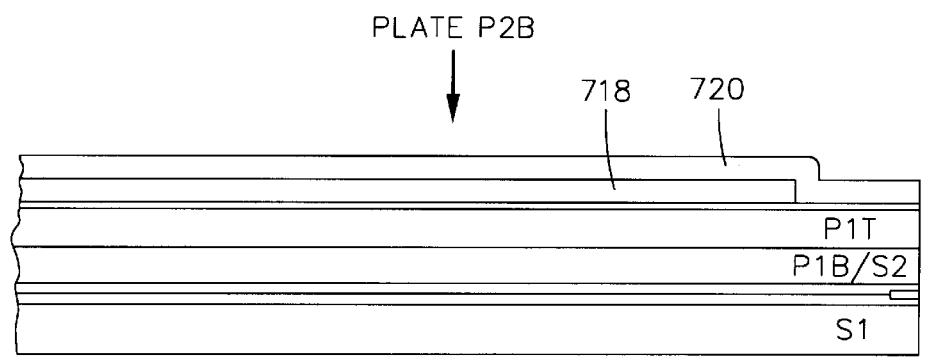
FIG. 22L is a view taken along plane 22L—22L of FIG. 22K.

FIG. 22E is the same as FIG. 22D except a photoresist layer 716 has been photopatterned on top of the write gap layer 714. FIG. 22F shows the configuration of the photoresist in a pole tip region of the head. FIG. 22G is the same as FIG. 22E except a ZTH defining layer 718 has been plated on the wafer. FIGS. 22I and 22J are the same as FIGS. 22G and 22H, respectively, except the photoresist has been removed. FIGS. 22K and 22L are the same as FIGS. 22I and 22J, respectively, except a bottom second pole tip layer 720 has been frame plated on the wafer.

Figure 22M:
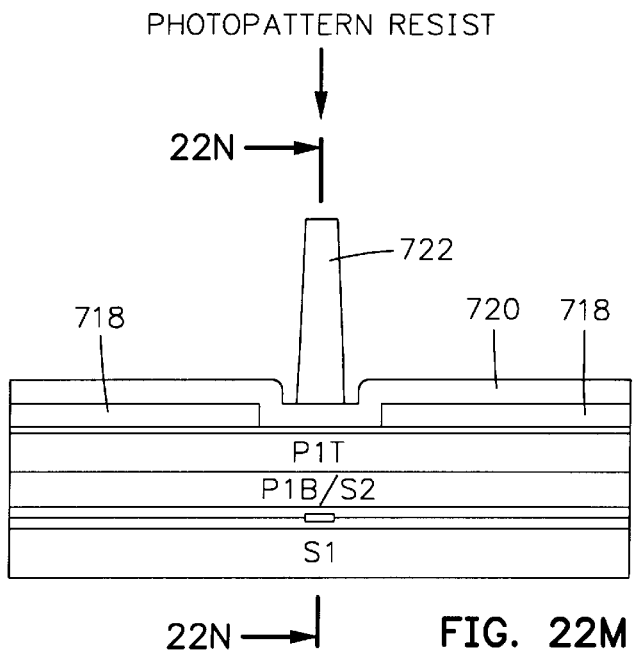
FIG. 22M is the same as FIG. 22K except a resist layer has been photopatterned.
Figure 22N:
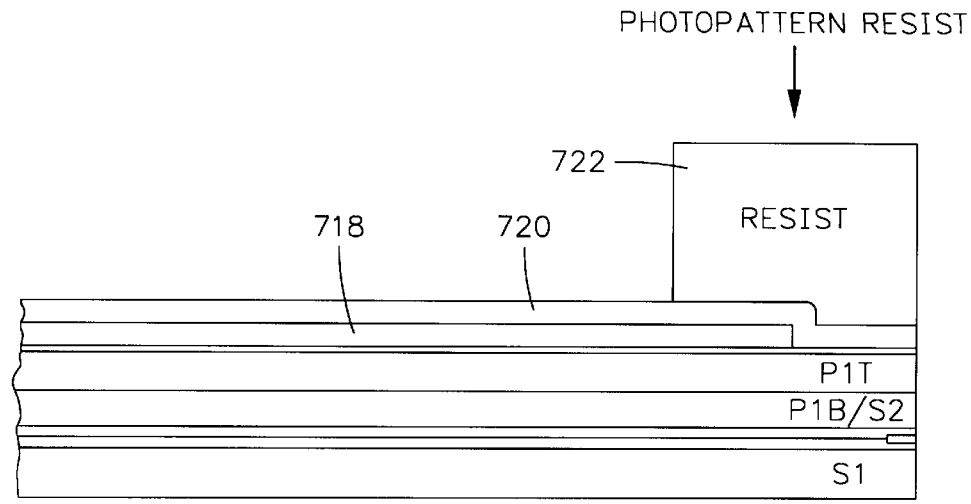
FIG. 22N is a view taken along plane 22N—22N of FIG. 22M.
Figure 22:
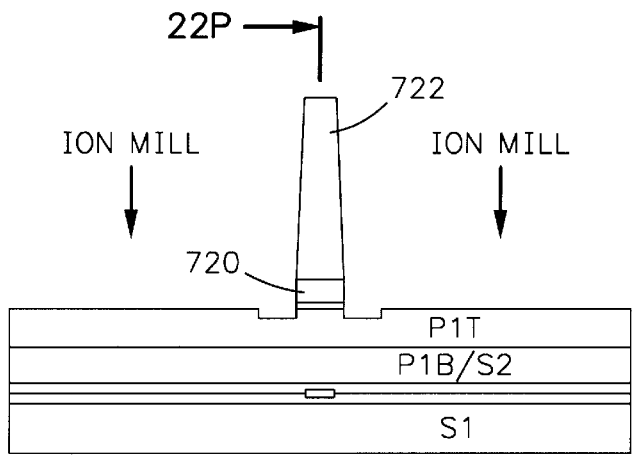
FIG. 22O is the same as FIG. 22N except ion milling has been partially completed.
FIG. 22P is a view taken along plane 22P—22P of FIG. 22O.
FIG. 22Q is the same as FIG. 22O except ion milling has been completed.
FIG. 22R is a view taken along plane 22R—22R of FIG. 22Q.
FIG. 22S is the same as FIG. 22Q except the resist layer has been removed.
FIG. 22T is a view taken along plane 22T—22T of FIG. 22S.
FIG. 22U is the same as FIG. 22T except a first insulation layer of an insulation stack and a coil layer has been sputter deposited.
FIG. 22V is the same FIG. 22S except an alumina layer has been deposited.
FIG. 22W is a view taken along plane 22W—22W of FIG. 22V.
FIG. 22X is the same as FIG. 22V except the alumina layer has been chemically mechanically polished (CMP)
FIG. 22Y is a view taken along plane 22Y—22Y of FIG. 22X.
FIG. 22Z is the same as FIG. 22Y except a resist layer has been photopatterned and ion milling has been implemented to remove the gap layer at the back gap.
Figure 22P:
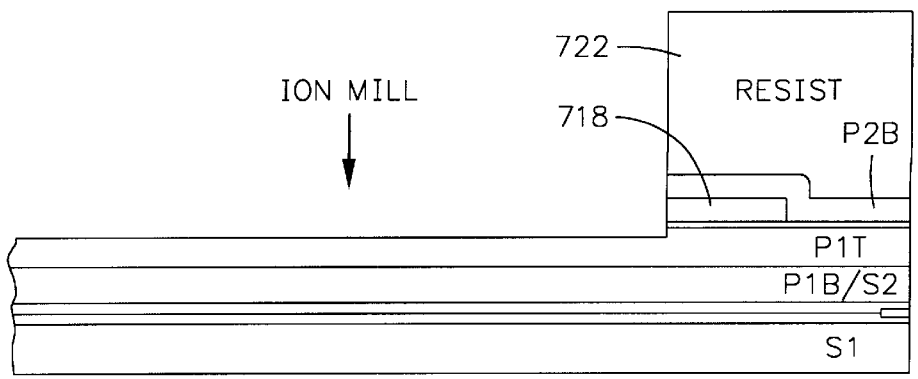
Figure 22Q:
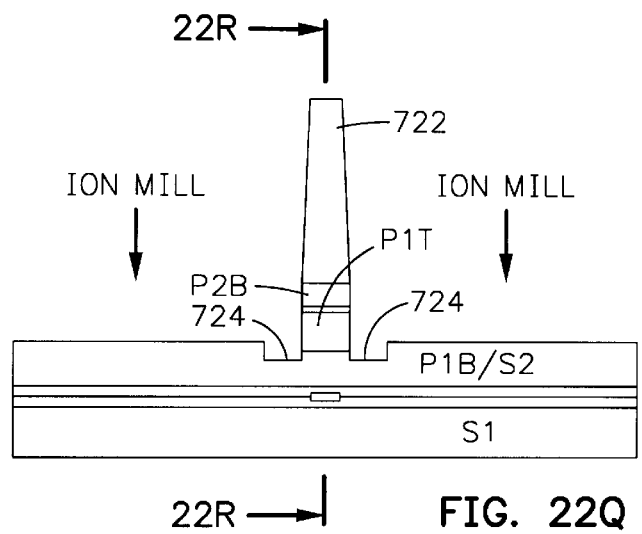
Figure 22R:
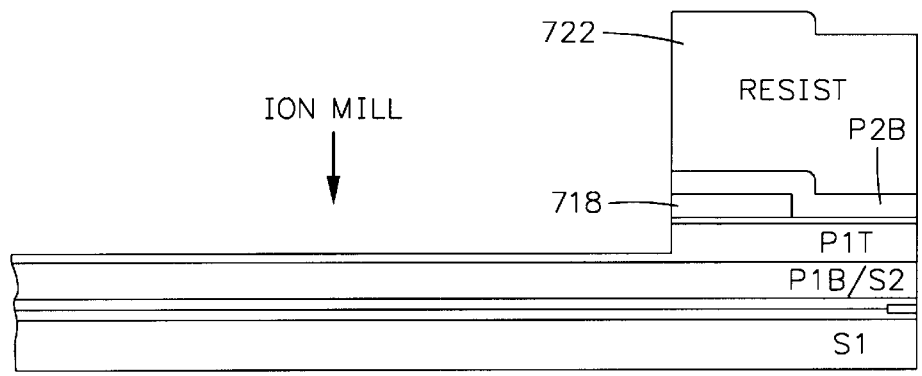
Figure 22S:
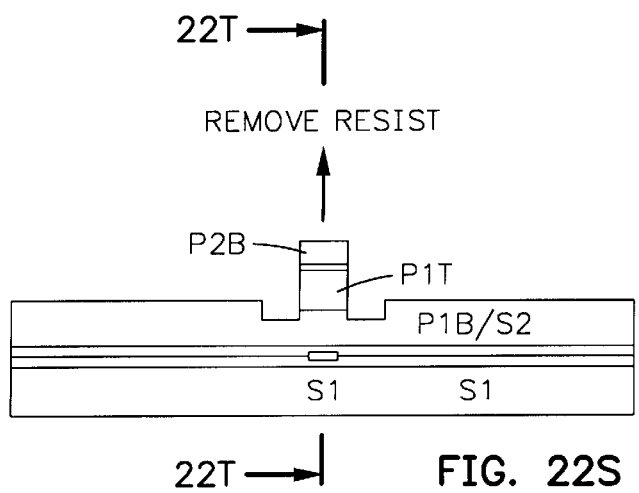
Figure 22T:
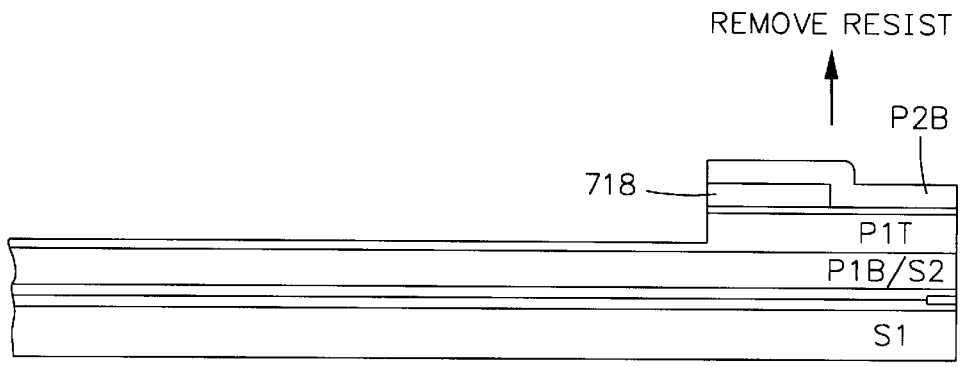

FIGS. 22M and 22N are the same as FIGS. 22K and 22L except resist has been spun on the wafer, light exposed and developed to produce the photopatterned photoresist layer 722. FIGS. 22O and 22P are the same as FIGS. 22M and 22O except ion milling has been implemented and has partially removed some of the layers. FIGS. 22Q and 22R are the same as FIGS. 22O and 22P except the ion milling has been completed causing a notching 724 of the bottom first pole tip layer adjacent first and second side edges of the top first pole tip layer. It should be noted that use of the ZTH defining layer 718, shown in FIGS. 22M and 22N, has protected the top surface of the bottom first pole piece layer 710 from thinning due to ion milling except at the notches 724. It can be seen from FIG. 22O that the ZTH defining layer 718 has set in motion notches for the bottom first pole piece layer 710 without reducing the thickness of the bottom first pole piece layer in first and second field locations outwardly from the notches 724. Accordingly, the present process assures that the first and second lead layers (not shown), which underlie the bottom first pole tip layer, have proper coverage by the bottom first pole piece layer 710. Notching of the bottom first pole piece layer 724, as shown in FIG. 22Q, will improve the track writing capability of the write head portion of the merged MR head. FIGS. 22S and 22T are the same as FIGS. 22Q and 22R except the photoresist layer has been removed.

Figure 22U:
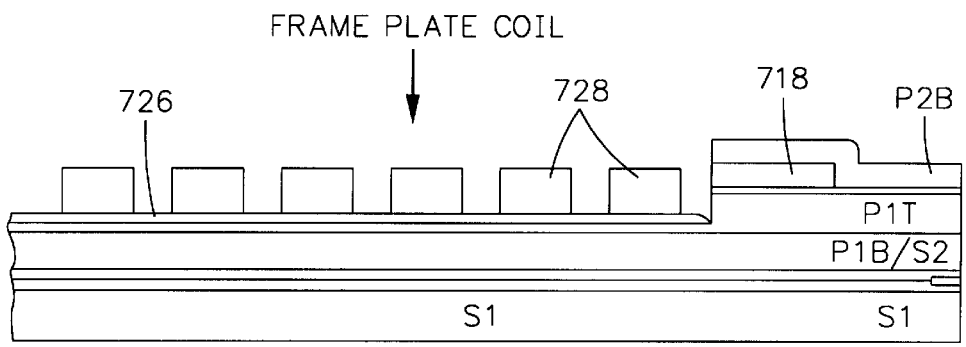
Figure 22V:
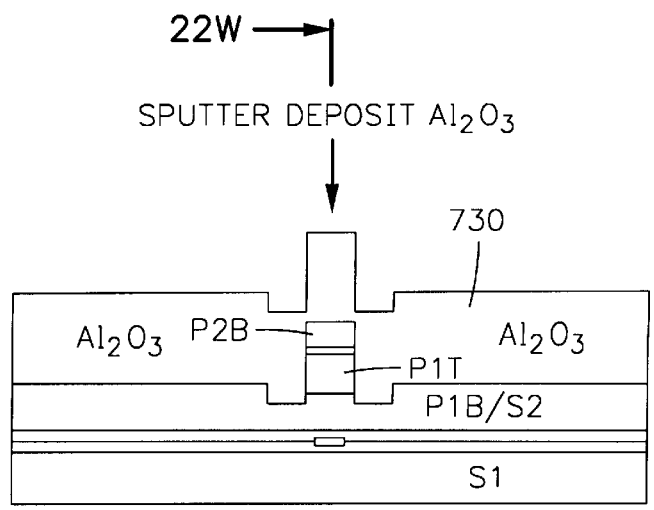
Figure 22W:
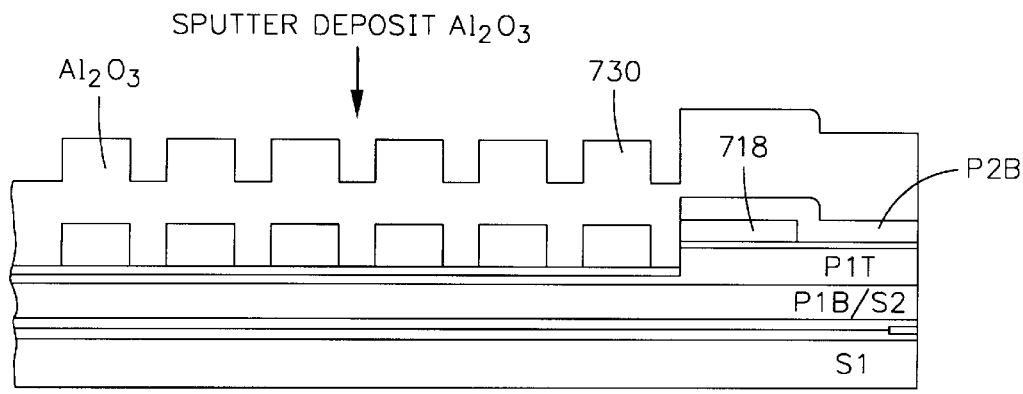
Figure 22X:
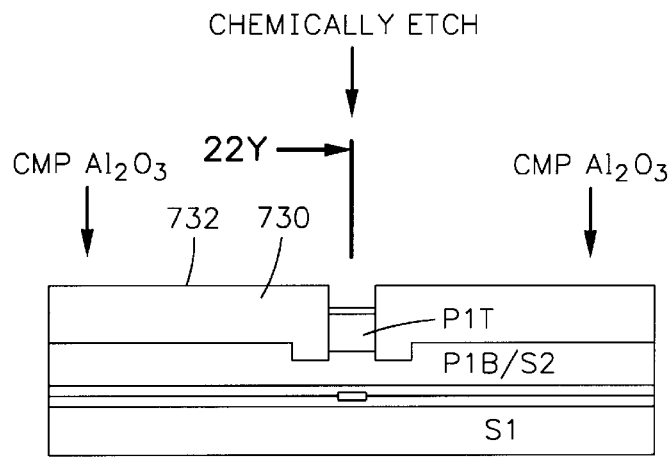
Figure 22Y:
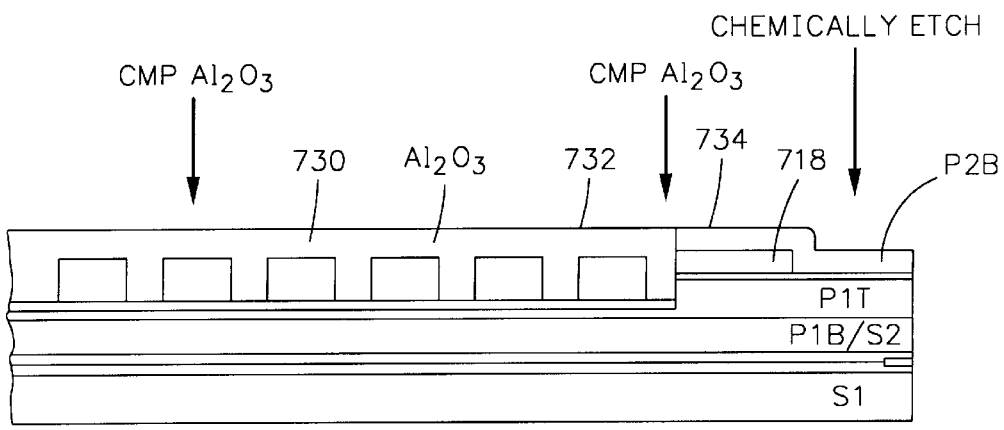
Figure 22A:
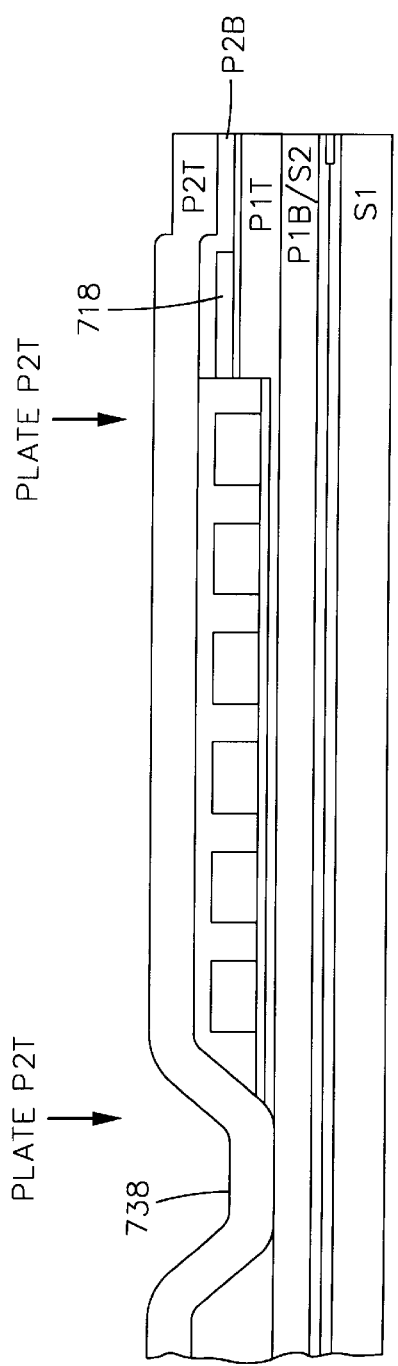
Figure 22A:
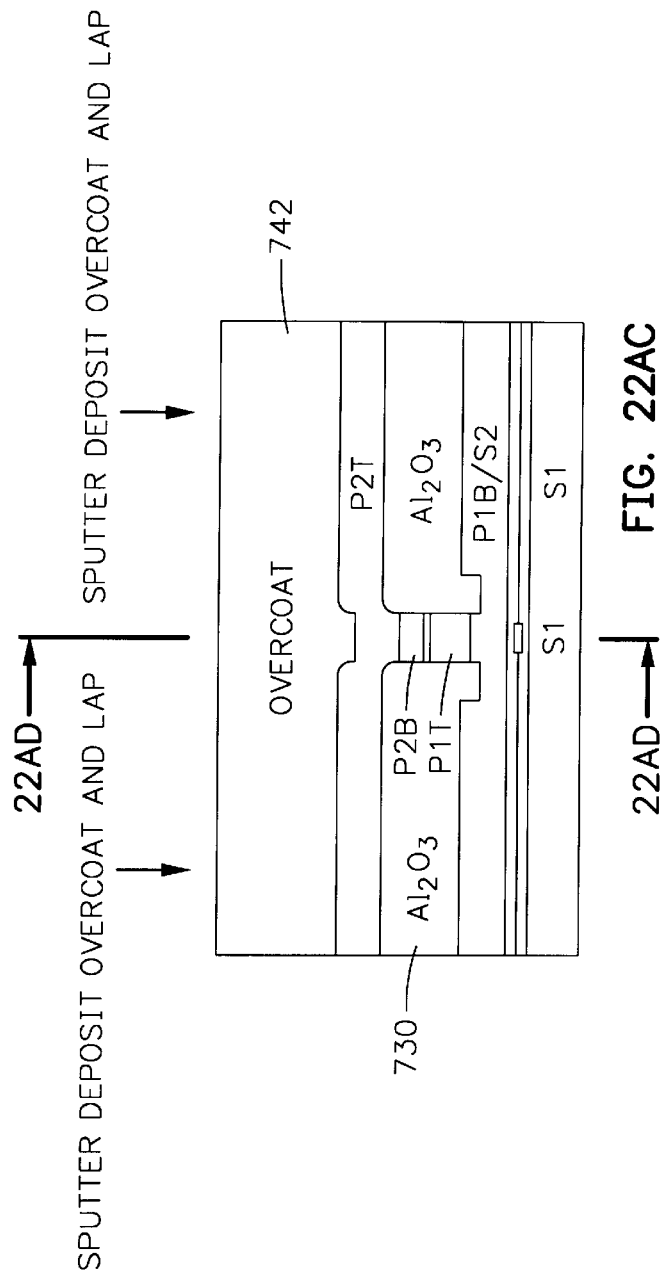
Figure 22A:
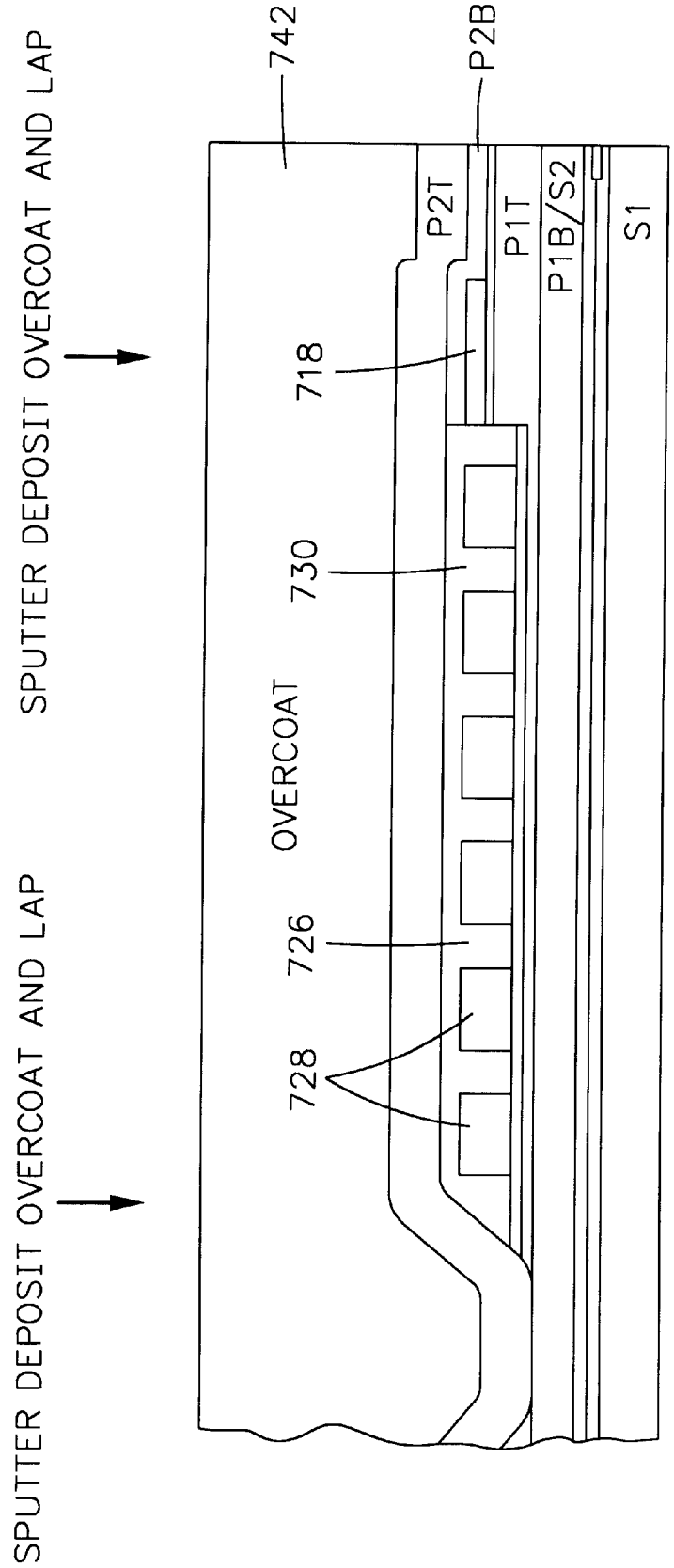

In FIG. 22U a first insulation layer 726 of an insulation stack has been sputter deposited on the bottom first pole tip layer followed by frame plating of a coil layer 728 on the first insulation layer. FIG. 22V is the same as FIG. 22S except alumina 730 is sputter deposited on the wafer after the coil layer is constructed, as shown in FIG. 22U. FIG. 22W is a view taken along plane 22W—22W showing a longitudinal cross-sectional view of the partially completed head after sputter depositing the alumina. FIGS. 22X and 22Y are the same as FIGS. 22V and 22W except the alumina layer has been chemically mechanically polished (CMP) until the alumina layer 730 has a top surface 732 that is flush with a top surface 734 of the bottom second pole tip layer and has been chemically etched to expose the top of the bottom second pole tip at the ABS.

FIG. 22Z is the same as FIG. 22Y except a photoresist layer 736 has been photopatterned and chemical etching has been implemented to remove the gap layer at the back gap 738. FIG. 22AA is the same as FIG. 22X except a top second pole piece layer 740 has been frame plated. FIG. 22AB is a view taken along plane 22AB—22AB of FIG. 22AA showing the frame plating of the top second pole piece layer. It should be noted that the top second pole piece layer 740 is substantially planar from the ABS until it dips down to make connection with the bottom first pole piece layer at the back gap 738. Because of the construction of the pedestal-type pole tip layers 712 and 720, the coil layer 728 is recessed lower than prior art coil layers allowing the planarization of the top second pole piece layer 740. It should be noted that the first insulation layer 726 of the insulation stack may optionally be constructed of baked photoresist. The merged magnetic head is completed in FIGS. 22AC and 22AD by sputter deposition of an overcoat layer 742 which may be alumina.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic write head that has a front air bearing surface (ABS) and a back gap comprising:
   first and second pole pieces;
   the first pole piece having a bottom first pole piece layer and a top first pole tip layer with the top first pole tip layer being on the bottom first pole piece layer and the second pole piece having a bottom second pole tip layer and a top second pole piece layer with the top second pole piece layer being on the bottom second pole tip layer;
   the bottom first pole piece layer and the top second pole piece layer being connected at the back gap and extending toward the ABS;
   an insulation stack with at least one coil layer embedded therein;
   the insulation stack being located between the bottom first pole piece layer and the top second pole piece layer in a position between the ABS and the back gap;
   the top first pole tip layer and the bottom second pole tip layer being located entirely between the ABS and the coil layer;
   a write gap layer;
   the write gap layer being located between the top first pole tip layer and the bottom second pole tip layer and separating the top first pole tip layer and the bottom second pole tip layer from one another at the ABS;
   a zero throat height (ZTH) defining layer on said write gap layer between the top first pole tip layer and the bottom second pole tip layer and recessed from the ABS toward the back gap so as to further separate the top first pole tip layer and the bottom second pole tip layer from one another at a location recessed from the ABS toward the back gap to define a zero throat height of the head where the first and second pole pieces first commence to separate from one another after the ABS.

2. A magnetic write head as claimed in claim 1 including:
   the bottom second pole tip layer having top and bottom surfaces and the coil layer having top and bottom surfaces; and
   the top surface of the coil layer being lower than the top surface of the bottom second pole tip layer.

3. A magnetic write head as claimed in claim 1 including:
   the bottom first pole piece layer having top and bottom surfaces; and
   the top surface of the bottom first pole piece layer being notched adjacent top first pole tip layer.

4. A magnetic write head as claimed in claim 1 wherein the ZTH defining layer has a thickness that is greater than a thickness of the write gap layer.

5. A magnetic write head as claimed in claim 1 wherein at least one of the top first pole tip layer and the bottom second pole tip layer is a material that has a magnetic moment that is higher than a magnetic moment of the material of either of the bottom first pole piece layer and the top second pole piece layer.

6. A magnetic write head as claimed in claim 1 wherein each of the write gap layer and the ZTH defining layer are alumina.

7. A magnetic write head as claimed in claim 1 wherein each of the write gap layer and the ZTH defining layer are a non-magnetic electrically conducting material.

8. A magnetic write head as claimed in claim 1 including:
   a second coil layer embedded in the insulation stack and having top and bottom surfaces;
   the bottom surface of the second coil layer being lower than the top surface of the bottom second pole tip layer.

9. A magnetic write head as claimed in claim 8 including:
   each of the top first pole tip layer, the bottom second pole tip layer, the write gap layer and the ZTH defining layer having front and back surfaces joined by first and second side surfaces;
   the front and back surfaces and the first and second side surfaces of the top first pole tip layer, the bottom second pole tip layer and the write gap layer being substantially aligned with respect to one another; and
   the back surfaces and the first and second side surfaces of the top first pole tip layer, the bottom second pole tip layer, the write gap layer and the ZTH defining layer being substantially aligned with respect to one another.

10. A magnetic write head as claimed in claim 9 including:
    the bottom first pole piece layer having top and bottom surfaces; and
    the top surface of the bottom first pole piece layer being notched adjacent top first pole tip layer.

11. A magnetic write head as claimed in claim 1 further including:
    each of the top first pole tip layer, the bottom second pole tip layer, the write gap layer and the ZTH defining layer having front and back surfaces joined by first and second side surfaces;
    the front and back surfaces and the first and second side surfaces of the top first pole tip layer, the bottom second pole tip layer and the write gap layer being substantially aligned with respect to one another; and
    the back surfaces and the first and second side surfaces of the top first pole tip layer, the bottom second pole tip layer, the write gap layer and the ZTH defining layer being substantially aligned with respect to one another.

12. A magnetic write head as claimed in claim 11 including:
    the bottom second pole tip layer having top and bottom surfaces and the coil layer having top and bottom surfaces; and
    the top surface of the coil layer being lower than the top surface of the bottom second pole tip layer.

13. A magnetic write head as claimed in claim 12 including:
    the bottom first pole piece layer having top and bottom surfaces; and
    the top surface of the bottom first pole piece layer being notched adjacent top first pole tip layer.

14. A magnetic write head as claimed in claim 13 wherein the ZTH defining layer has a thickness that is greater than a thickness of the write gap layer.

15. A magnetic write head as claimed in claim 14 wherein at least one of the top first pole tip layer and the bottom second pole tip layer is a material that has a magnetic moment that is higher than a magnetic moment of the material of either of the bottom first pole piece layer and the top second pole piece layer.

16. A magnetic write head as claimed in claim 15 wherein each of the write gap layer and the ZTH defining layer are alumina.

17. A magnetic write head as claimed in claim 15 wherein each of the write gap layer and the ZTH defining layer are NiP.

18. A magnetic disk drive comprising:
- a merged magnetic head having an air bearing surface (ABS) and including:
- a first shield layer;
- a first read gap layer on the first shield layer;
- a read sensor and first and second lead layers on the first read gap layer;
- a second read gap layer on the read sensor and the first and second lead layers;
- first and second pole pieces, the first pole piece being on the second read gap layer;
- the first pole piece having a bottom first pole piece layer and a top first pole tip layer with the top first pole tip layer being on the bottom first pole piece layer and the second pole piece having a bottom second pole tip layer and a top second pole piece layer with the top second pole piece layer being on the bottom second pole tip layer;
- the bottom first pole piece layer and the top second pole piece layer being connected at a back gap and extending toward the ABS;
- an insulation stack with at least one coil layer embedded therein;
- the insulation stack being located between the bottom first pole piece layer and the top second pole piece layer in a position between the ABS and the back gap;
- the top first pole tip layer and the bottom second pole tip layer being located entirely between the ABS and the coil layer;
- a write gap layer;
- the write gap layer being located between the top first pole tip layer and the bottom second pole tip layer and separating the top first pole tip layer and the bottom second pole tip layer from one another at the ABS; and
- a zero throat height (ZTH) defining layer on said write gap layer between the top first pole tip layer and the bottom second pole tip layer and recessed from the ABS toward the back gap so as to further separate the top first pole tip layer and the bottom second pole tip layer from one another at a location recessed from the ABS toward the back gap to define a zero throat height of the head where the first and second pole pieces first commence to separate from one another after the ABS;
- a frame;
- a magnetic disk rotatably supported on the frame;
- a support mounted on the frame for supporting the magnetic head in a transducing relationship with the magnetic disk;
- means for rotating the magnetic disk;
- positioning means connected to the support for moving the magnetic head to multiple positions with respect to said magnetic disk; and
- means connected to the head, to the means for rotating the magnetic disk and to the positioning means for exchanging signals with the magnetic head, for controlling movement of the magnetic disk and for controlling the position of the magnetic head.

19. A magnetic disk drive as claimed in claim 18 including:
- each of the top first pole tip layer, the bottom second pole tip layer, the write gap layer and the ZTH defining layer having front and back surfaces joined by first and second side surfaces;
- the front and back surfaces and the first and second side surfaces of the top first pole tip layer, the bottom second pole tip layer and the write gap layer being substantially aligned with respect to one another; and
- the back surfaces and the first and second side surfaces of the top first pole tip layer, the bottom second pole tip layer, the write gap layer and the ZTH defining layer being substantially aligned with respect to one another.

20. A magnetic disk drive as claimed in claim 19 including:
- the bottom second pole tip layer having top and bottom surfaces and the coil layer having top and bottom surfaces; and
- the top surface of the coil layer being lower than the top surface of the bottom second pole tip layer.

21. A magnetic disk drive as claimed in claim 20 including:
- the bottom first pole piece layer having top and bottom surfaces; and
- the top surface of the bottom first pole piece layer being notched adjacent top first pole tip layer.

22. A magnetic disk drive as claimed in claim 21 wherein the ZTH defining layer has a thickness that is greater than a thickness of the write gap layer.

23. A magnetic disk drive as claimed in claim 22 wherein at least one of the top first pole tip layer and the bottom second pole tip layer is a material that has a magnetic moment that is higher than a magnetic moment of the material of either of the bottom first pole piece layer and the top second pole piece layer.

24. A magnetic disk drive as claimed in claim 19 including:
- a second coil layer embedded in the insulation stack and having top and bottom surfaces;
- the bottom surface of the second coil layer being lower than the top surface of the bottom second pole tip layer.

25. A magnetic disk drive as claimed in claim 24 including:
- the bottom first pole piece layer having top and bottom surfaces; and
- the top surface of the bottom first pole piece layer being notched adjacent top first pole tip layer.

* * * * *